(12) United States Patent
Safdari et al.

(10) Patent No.: US 12,563,283 B2
(45) Date of Patent: Feb. 24, 2026

(54) SYSTEMS AND METHODS FOR LIGHT FIELD IMAGING WITH MIRROR ARRAYS

(71) Applicant: The Board of Trustees of the Leland Stanford Junior University, Stanford, CA (US)

(72) Inventors: Murtaza Safdari, Stanford, CA (US); Sanha Cheong, Stanford, CA (US); Josef Frisch, Stanford, CA (US); Sean Gasiorowski, Stanford, CA (US); Michael Kagan, Stanford, CA (US); Ariel Schwartzman, Stanford, CA (US); Maxime Vandegar, Stanford, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 147 days.

(21) Appl. No.: 18/318,545

(22) Filed: May 16, 2023

(65) Prior Publication Data

US 2023/0370708 A1 Nov. 16, 2023

Related U.S. Application Data

(60) Provisional application No. 63/364,799, filed on May 16, 2022.

(51) Int. Cl.
| | |
|---|---|
| *H04N 23/55* | (2023.01) |
| *G06T 15/50* | (2011.01) |
| *H04N 23/957* | (2023.01) |

(52) U.S. Cl.
CPC ........... *H04N 23/55* (2023.01); *G06T 15/506* (2013.01); *H04N 23/957* (2023.01)

(58) Field of Classification Search
CPC ..... H04N 23/55; H04N 23/957; G06T 15/506
See application file for complete search history.

(56) References Cited

U.S. PATENT DOCUMENTS

| | | | |
|---|---|---|---|
| 2012/0219183 A1* | 8/2012 | Mori | G06T 7/20 |
| | | | 382/103 |
| 2015/0168699 A1* | 6/2015 | Lee | G02B 17/0856 |
| | | | 359/726 |
| 2023/0260200 A1* | 8/2023 | Aroudj | G06T 15/20 |
| | | | 345/418 |

FOREIGN PATENT DOCUMENTS

| | | | | |
|---|---|---|---|---|
| CN | 105425526 A | * | 3/2016 | G03B 35/00 |

OTHER PUBLICATIONS

Abe et al., "Matter-wave Atomic Gradiometer Interferometric Sensor (MAGIS-100)", Quantum Science and Technology, Jul. 9, 2021, vol. 6, No. 4, 044003, 65 pgs., doi: 10.1088/2058-9565/abf719.

(Continued)

*Primary Examiner* — Nasim N Nirjhar
(74) *Attorney, Agent, or Firm* — KPPB LLP

(57) ABSTRACT

Systems and method for light field imaging with mirror arrays in accordance with embodiments of the invention are illustrated. One embodiment includes a light field imaging system, including a mirror array where each mirror in the mirror array is positioned to reflect light from a target object towards a lens such that a different view of the target object is visible in each mirror from the viewpoint of the lens. The system further includes a lens configured to focus the reflected light, a sensor configured to capture an image depicting a plurality of reflections of the target object, a processor, and a memory containing a light field imaging application that directs the processor to obtain the captured image, extract a light field of the target object based on the (Continued)

plurality of reflections of the target object, and construct a three-dimensional model of the target object based on the light field.

20 Claims, 22 Drawing Sheets

(56)                    References Cited

OTHER PUBLICATIONS

Lindell et al., "AutoInt: Automatic Integration for Fast Neural Volume Rendering", IEEE/CVF Conference on Computer Vision and Pattern Recognition (CVPR), 2021, 10 pgs., doi: 10.1109/CVPR46437.2021.01432.

Mildenhall et al., "NeRF: Representing Scenes as Neural Radiance Fields for View Synthesis", Proceedings of ECCV, 2020, arXiv:2003.08934v2 [cs.CV], Aug. 3, 2020, 25 pgs.

Reed et al., "Dynamic CT Reconstruction from Limited Views with Implicit Neural Representations and Parametric Motion Fields", IEEE/CVF International Conference on Computer Vision (ICCV), 2021, arXiv:2104.11745v1 [eess.IV], Apr. 23, 2021, pp. 2238-2248, doi: 10.1109/ICCV48922.2021.00226.

Reed et al., "Implicit Neural Representations for Deconvolving SAS Images", Oceans, San Diego—Porto, 2021, arXiv:2112.08539v1 [cs.CV] Dec. 16, 2021, 7 pgs.

Rosenthal et al., "Optimal Determination of Particle Orientation, Absolute Hand, and Contrast Loss in Single-particle Electron Cryomicroscopy", Journal of Molecular Biology, Oct. 31, 2003, vol. 333, No. 4, pp. 721-745, doi: 10.1016/j.jmb.2003.07.013.

Sitzmann et al., "Implicit Neural Representations with Periodic Activation Functions", Proceedings of NeurIPS, 2020, arXiv:2006.09661v1 [cs.CV] Jun. 17, 2020, 35 pgs.

Sitzmann et al., "Scene Representation Networks: Continuous 3D-Structure-Aware Neural Scene Representations", 33rd Conference on Neural Information Processing Systems (NeurIPS 2019), Vancouver, Canada, arXiv:1906.01618 [cs.CV], 12 pgs.

Sugarbaker et al., "Enhanced Atom Interferometer Readout through the Application of Phase Shear", Physical Review Letters, Sep. 13, 2013, vol. 111, No. 11, pp. 113002-1-113002-5, doi: 10.1103/physrevlett.111.113002.

Sun et al., "CoIL: Coordinate-Based Internal Learning for Tomographic Imaging", IEEE Transactions on Computational Imaging, Nov. 8, 2021, vol. 7, pp. 1400-1412, doi: 10.1109/TCI.2021.3125564.

Van Heel et al., "Fourier shell correlation threshold criteria", Journal of Structural Biology, Sep. 2005, vol. 151, No. 3, pp. 250-262, doi: 10.1016/j.jsb.2005.05.009.

Wang et al., "NeuS: Learning Neural Implicit Surfaces by Volume Rendering for Multi-view Reconstruction", 35th Conference on Neural Information Processing Systems (NeurIPS 2021), arXiv:2106.10689v3 [cs.CV] Feb. 1, 2023, 23 pgs.

Wu et al., "Light Field Image Processing: An Overview", IEEE Journal of Selected Topics in Signal Processing, Aug. 2017, vol. 11, No. 7, pp. 926-954, doi: 10.1109/JSTSP.2017.2747126.

Xie et al., "Neural Fields in Visual Computing and Beyond", Computer Graphics Forum, May 2022, vol. 41, No. 2, pp. 641-676, doi: 10.1111/cgf.14505.

Zhang et al., "NeRF++: Analyzing and Improving Neural Radiance Fields", arXiv:2010.07492v2 [cs.CV] Oct. 21, 2020, 9 pgs.

Zhou et al., "Review of light field technologies", Visual Computing for Industry, Biomedicine, and Art, Dec. 3, 2021, vol. 4, No. 29, 13 pgs., doi: 10.1186/s42492-021-00096-8.

* cited by examiner

500

700

Begin

710

Receive captured light field of target object

720

Provide captured light field to reconstruction model

730

Reconstruct images of target object using the captured light field

End

Real

Generated

SYSTEMS AND METHODS FOR LIGHT FIELD IMAGING WITH MIRROR ARRAYS

CROSS-REFERENCE TO RELATED APPLICATIONS

The current application claims the benefit of and priority under 35 U.S.C. § 119(e) to U.S. Provisional Patent Application No. 63/364,799 entitled "Novel Light-Field Imaging Device with Enhanced Light Collection for Cold Atom Clouds" filed May 16, 2022. The disclosures of U.S. Provisional Patent Application No. 63/364,799 are hereby incorporated by reference in its entirety for all purposes.

STATEMENT OF FEDERALLY SPONSORED RESEARCH

This invention was made with Government support under contract DE-AC02-76SF00515 awarded by the Department of Energy. The Government has certain rights in the invention.

FIELD OF THE INVENTION

The present invention generally relates to optics and, more specifically, capturing light fields of objects in low light conditions.

BACKGROUND

The light field is a vector function that describes the amount of light flowing in every direction at every point in space. Light fields can be referred to as the volumetric information of a scene. While traditional photography has served as an effective means for image capturing, it was only able to acquire information through bidimensional projections of particular scenes. Light field imaging, on the other hand, is capable of providing information in additional dimensions, and can hence provide information of particular scenes in a more comprehensive manner.

Mirrors are objects with smooth surfaces that reflect images. Lights of an object placed in front of a mirror can bounce off a mirror to project an image of the object. Mirrors can reverse the direction of the image in an equal but opposite angle from where the light shines upon the mirror. Mirrors allow viewers to see themselves or objects behind them, or objects that are at an angle from them, but may be out of their field of view.

SUMMARY OF THE INVENTION

Systems and methods for light field imaging with mirror arrays in accordance with embodiments of the invention are illustrated. One embodiment includes a light field imaging system. The light field imaging system further includes a mirror array including a plurality of mirrors, where each mirror in the plurality of mirrors is positioned to reflect light from a target object towards a lens such that a different view of the target object is visible in each mirror in the plurality of mirrors from the viewpoint of the lens, a lens configured to focus the reflected light, and a sensor configured to capture an image depicting a plurality of reflections of the target object. The system further includes a processor, and a memory containing a light field imaging application that directs the processor to obtain the captured image, extract a light field of the target object based on the plurality of reflections of the target object, and construct a three-dimensional model of the target object based on the light field.

In another embodiment, the light field imaging application directs the processor to map each of the plurality of reflected lights to its corresponding predetermined angle, and measure an intensity and a direction of each of the plurality of reflected lights.

In a further embodiment, each view in the plurality of views of the target object is a folded view comprising reflected light rays off of the target object off a corresponding mirror, and light rays directly off of the target object.

In still another embodiment, the processor constructs the image of the target object by representing the target object as densities dependent on 3D spatial coordinates.

In a still further embodiment, the processor uses a fully differentiable reconstruction model to construct the image of the target object.

In yet another embodiment, the constructing of the image of the target object is gradient-based.

In a yet further embodiment, the mirror array further comprises an alignment grid capable of putting the mirror array in focus of the lens.

In another additional embodiment, the plurality of mirrors comprises a plurality of 5 mm diameter smooth mirrors.

In a further additional embodiment, the target object is suspended in front of the center of the mirror array.

In another embodiment again, the reconstruction model is trained by extracting a set of views from the plurality of views where each view is a set of pixels and an intensity for each pixel from the set of pixels, and training the reconstruction model with the extracted set of views.

One embodiment includes a method for light field imaging with mirror arrays including projecting light at a target object, reflecting light from the target object towards a lens using mirror array comprising a plurality of mirrors such that a different view of the target object is visible in each mirror in the plurality of mirrors from the viewpoint of the lens, focusing the reflected light at the lens, capturing an image depicting a plurality of reflections of the target object, obtaining the captured image, extracting a light field of the target object based on the plurality of reflections of the target object, and constructing a three-dimensional model of the target object based on the light field.

Additional embodiments and features are set forth in part in the description that follows, and in part will become apparent to those skilled in the art upon examination of the specification or may be learned by the practice of the invention. A further understanding of the nature and advantages of the present invention may be realized by reference to the remaining portions of the specification and the drawings, which forms a part of this disclosure.

BRIEF DESCRIPTION OF THE DRAWINGS

The description and claims will be more fully understood with reference to the following figures and data graphs, which are presented as exemplary embodiments of the invention and should not be construed as a complete recitation of the scope of the invention.

DETAILED DESCRIPTION

Figure 1A:
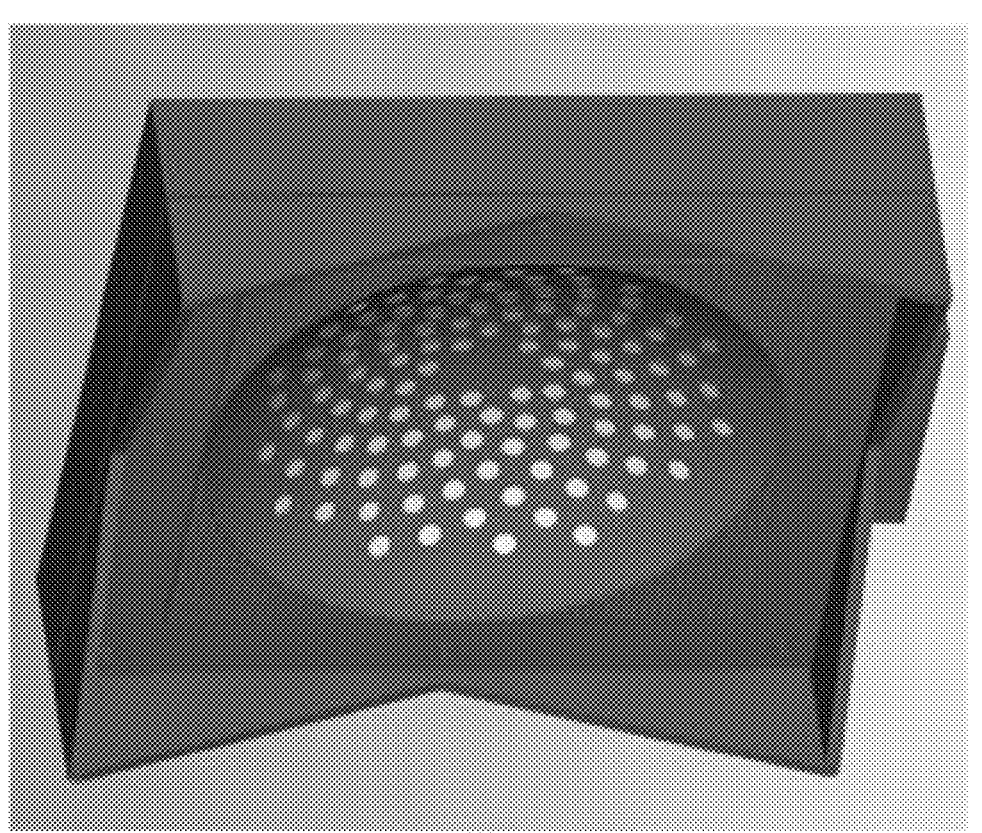
FIGS. 1A-F illustrates various views of a mirror array for light field imaging in accordance with an embodiment of the invention.

Light field technology is based on the plenoptic function, which provides a basis for capturing all the information about each light ray in the scene. The plenoptic function provides that light rays can be defined as vectors that describe the amount of light flowing in every direction through every point in space. A light ray may be defined by in 3D space by coordinates that determine its position and angles that specify its direction. Using light field technology in imaging can lead to high-quality image generation that provides for accurate depths of fields. Plenoptic cameras, also known as light field cameras, can be used to capture information about the light field emanating from a scene including the intensity and the direction of the light rays. The ability to capture images from multiple angles can enable the characterization of key sources of systematic uncertainty.

Conventional plenoptic cameras such as the Lytro formerly produced by Lytro, Inc. of Mountain View, California, utilize a microlens array over an image sensor. The microlens array resolves the scene from multiple viewpoints on the image sensor to capture the light field. However, this approach requires significant external lighting in order to fully capture the scene. This makes microlens arrays impractical for situations which require low light (e.g. imaging of cold atom fields) or could otherwise be performed in a lower light environment.

In order to address these shortcomings, systems and methods described herein capture the light field using an external array of mirrors positioned behind a target object to be imaged. This enables the use of a large numerical aperture which can provide significantly more light collection. Typically, the use of a large numerical aperture lens can lead to decreased depth of field in the resulting images, as higher depth of field generally requires the use of low numerical aperture lens. Maximizing both light collection and depth of field in the resulting images at the same time can therefore be difficult to accomplish. Further, the interest in maximizing light collection may jeopardize the ability of the imaging system to resolve the features of the interference fringes. When the target object is small, the parameters should be chosen such that the circle of confusion in imaging is also small such that the features of the object can be identified. Usage of the mirror array remedies the depth-of-field issues associated with large numerical aperture lenses.

In many embodiments, systems and methods described herein have a camera with a large numerical aperture lens positioned at a fixed distance from a stage which is backed by a mirror array. A target object is suspended over the stage and illuminated. Light from the target object is reflected by the mirror array towards the lens, which focuses the reflected light onto the camera image sensor. The dimensions of the sensor can be mapped onto the focal plane of the lens to capture a light field of the target object. The light field can then be used to reconstruct a 3-dimensional model of the target object. Usage of the external mirror array as opposed to a microlens array decreases the amount of light needed to capture the light field of the target object. In numerous embodiments, the mirror array is curved due to mirrors in the mirror array's angular positioning requirements. In several embodiments, collecting light from a larger set of angles around the object captures more of the light field, which in turn provides more information to reconstruct the object from the captured image. The imaging system is capable of performing multi-view imaging and 3D reconstruction. The system can be deployed quickly and cost-effectively in additional settings to quickly and accurately image objects that are small to increase efficiency of process. Imaging system architectures are discussed in further detail below.

Imaging System Design

A mirror array used to reflect and generate light fields of an object in accordance with an embodiment of the invention is illustrated in FIG. 1A. In numerous embodiments, the mirror array includes a plurality of mirrors positioned as an array. Commercially available flat circular mirrors may be used for the mirror array. In many embodiments, 5 mm mirrors are used for the mirror array, as they are the smallest mirrors available off-the-shelf, thereby increasing the number of mirrors that could be fitted onto the mirror array. The 5 mm diameter can be small enough to pack the range of solid angle efficiently and accommodate up to n=111 views while being large enough to allow for a sufficient field-ofview for an 1 mm target object. However, depending on the particular use case, different sizes or number of mirrors can be used. For example, when imaging large objects, larger mirrors may be used as the stage is scaled up to fit the target object. Further, if lower resolution modeling is sufficient for a given application, fewer mirrors may be used to reduce computational complexity. As can be readily appreciated, it is not a requirement to maximize the number of mirrors in the array.

Figure 1B:
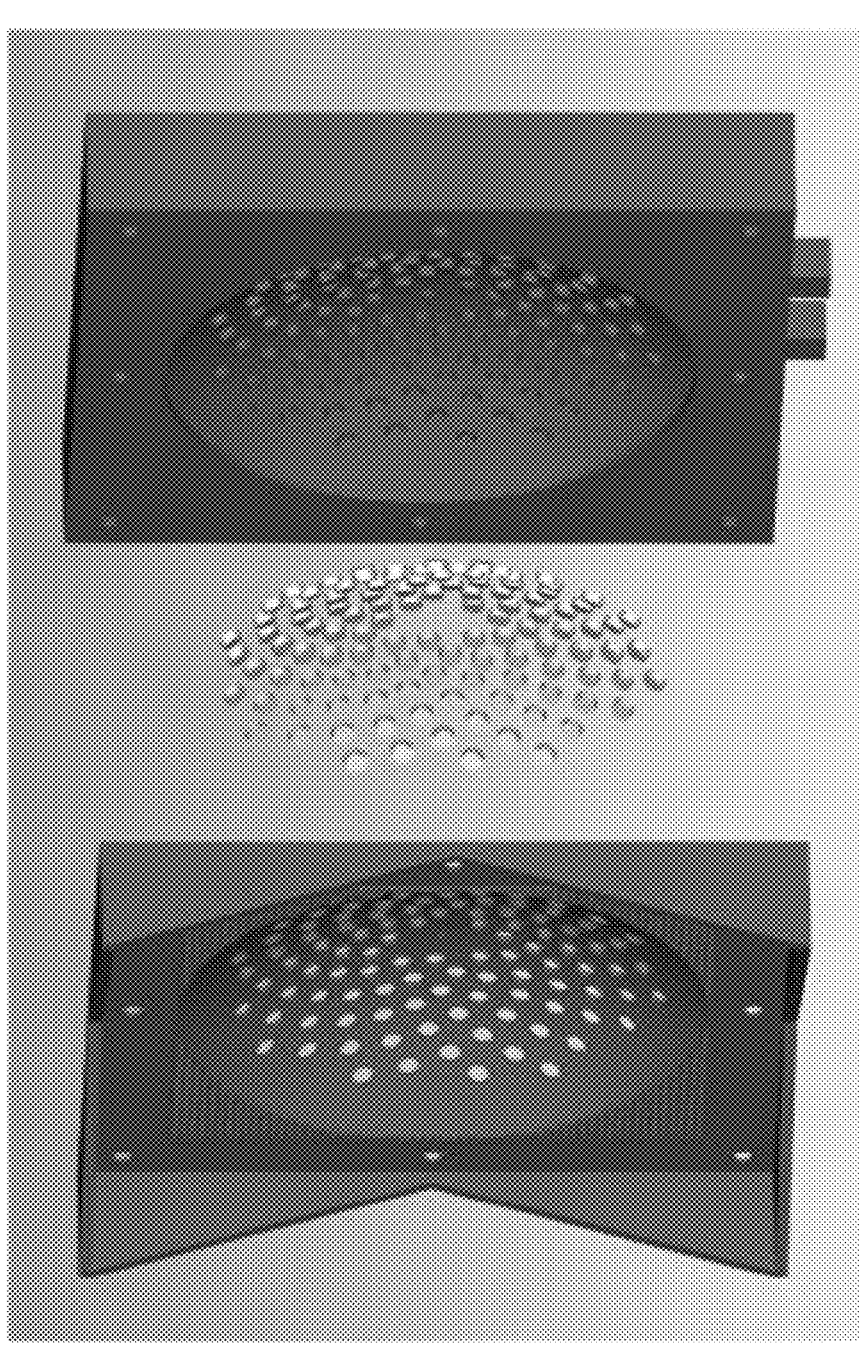
Figure 1D:
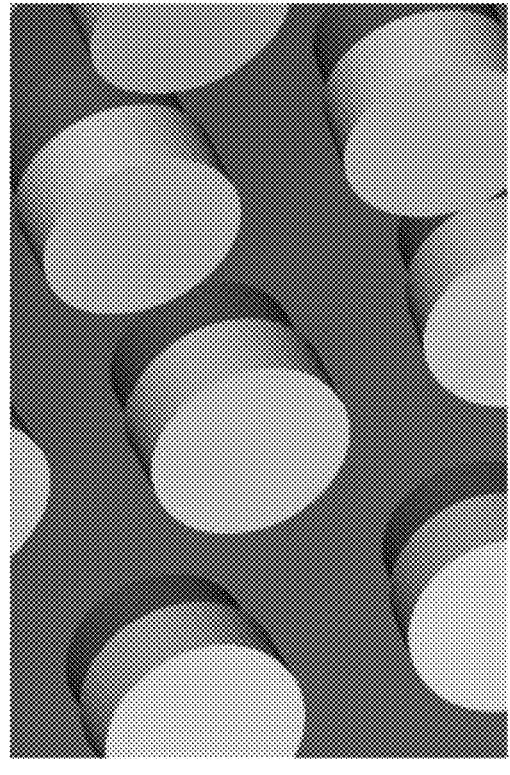
Figure 1C:
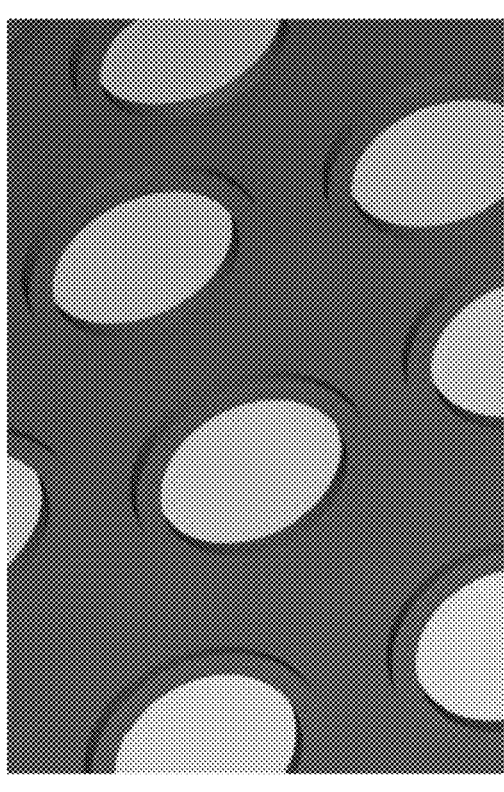

In many embodiments, the mirror array includes two 3D-printed components that can be assembled together to hold the mirror array in place. FIG. 1B illustrates an exploded view of the mirror array according to an embodiment of the invention. The array of mirrors can be held in their respective positions and angles by two 3D-printed components as illustrated in FIGS. 1A and 1B. The two components and the mirrors can be tightened using bolts and nuts along the edges of the mirror array. A section of the front component in accordance with an embodiment of the invention is illustrated in FIG. 1C. In several embodiments, the front component has an array of small holes inclined to the optical axis of the mirror array for socketing and positioning the mirrors at different angles. FIG. 1D illustrates a section of the rear component in accordance with an embodiment of the invention. In many embodiments, the rear component has an array of cylinders that can line up with the small holes of the front component. The array of cylinders can push and apply pressure to the mirrors after assembly, so that the mirrors are not floating freely.

Figure 1E:
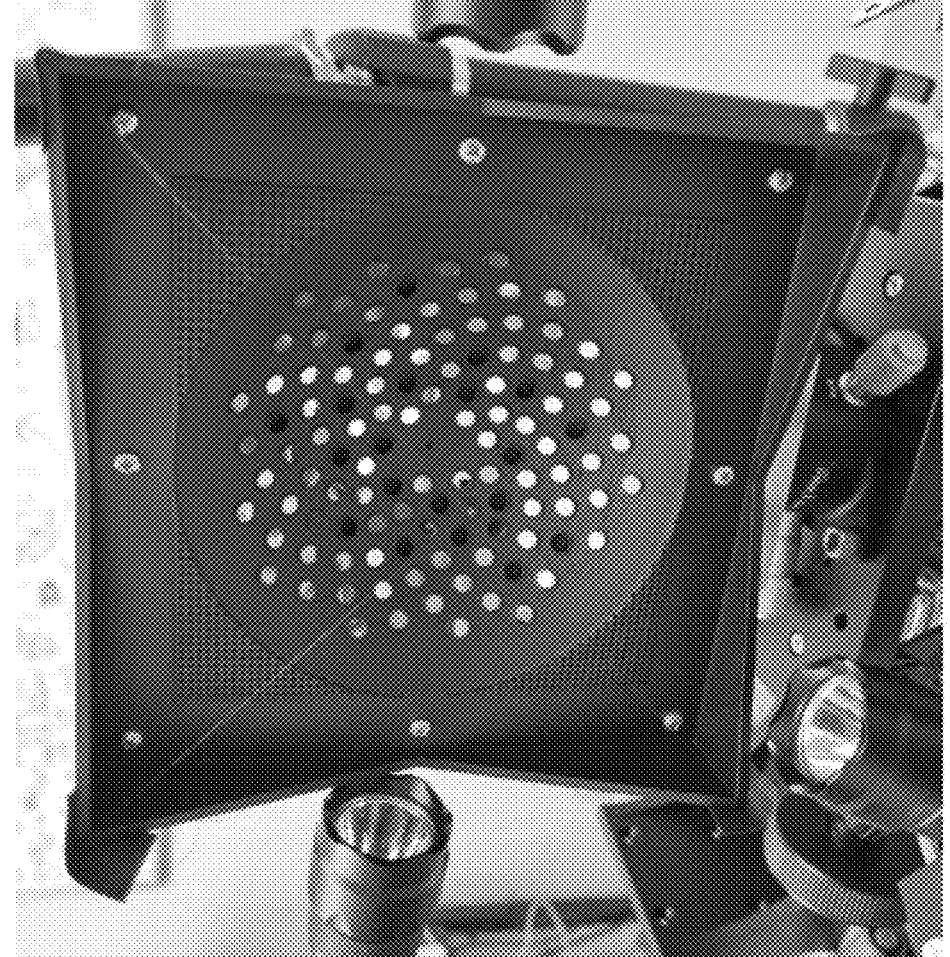

The nominal thickness of the front component may be 1 mm which is thinner than the nominal thickness of the mirrors 1.5 mm. This can help ensure that the cylindrical knobs from the back board are pushing the mirrors. In several embodiments, the front board has angled brackets around its edges. An assembled mirror array in accordance with an embodiment of the invention is illustrated in FIG. 1E. The dimensions of the brackets are set such that the front-most plane can define the nominal imaging target position along the optical axis (x=0). The corners of the angle brackets may be engraved with grooves, and thin fibers can be used to place the target object at the precise nominal position using these grooves as depicted in FIG. 1E. The mirror array may be 3D-printed. This can set the positional and the angular resolutions of the mirror holes on the front board.

Figure 1F:
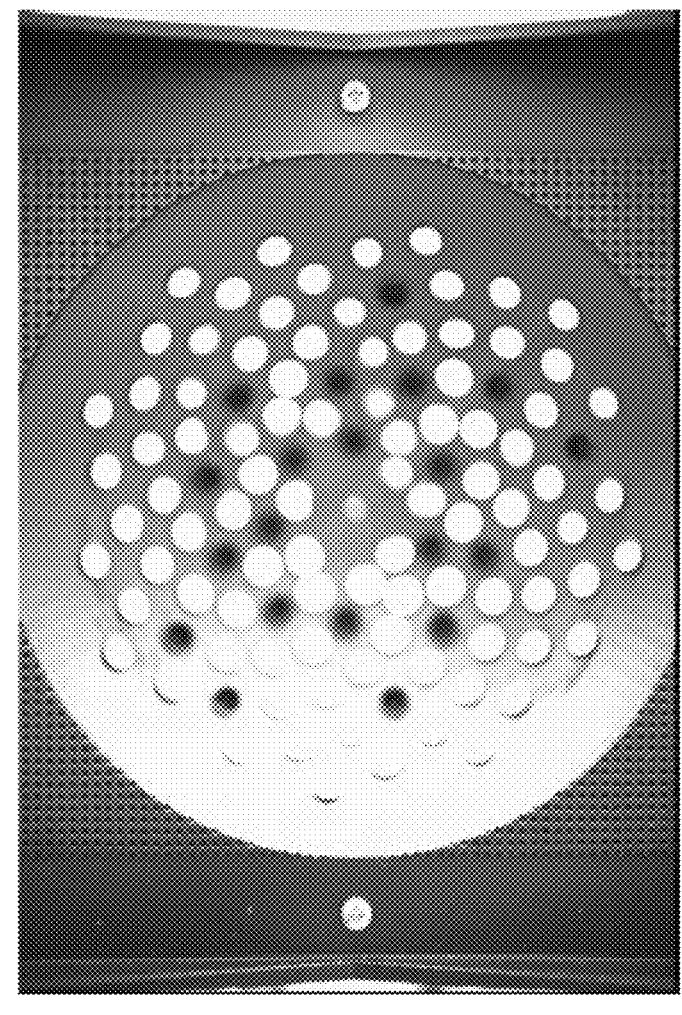

In selected embodiments, the front component has an alignment grid, a 12 cm×12 cm square grid of 1 mm wide and 1 mm deep lines printed on its flat surface. A front view of the mirror array showing the alignment grid in accordance with an embodiment of the invention is illustrated in FIG. 1F. The mirror array may be aligned perpendicular to the optical axis to ensure that the entire alignment grid is simultaneously in focus while operating at low depth-of-field (DoF). In some embodiments, the effective DoF is approximately 2 mm, meaning that the mirror array can be aligned closely to the exact perpendicular plane.

Although a specific example of a mirror array is illustrated in this figure, any of a variety of mirror array can be utilized to perform light field imaging similar to those described herein as appropriate to the requirements of specific applications in accordance with embodiments of the invention. For example, a different component or set of components that hold the mirrors in place can be used without departing from the scope or spirit of the invention.

Figure 2:
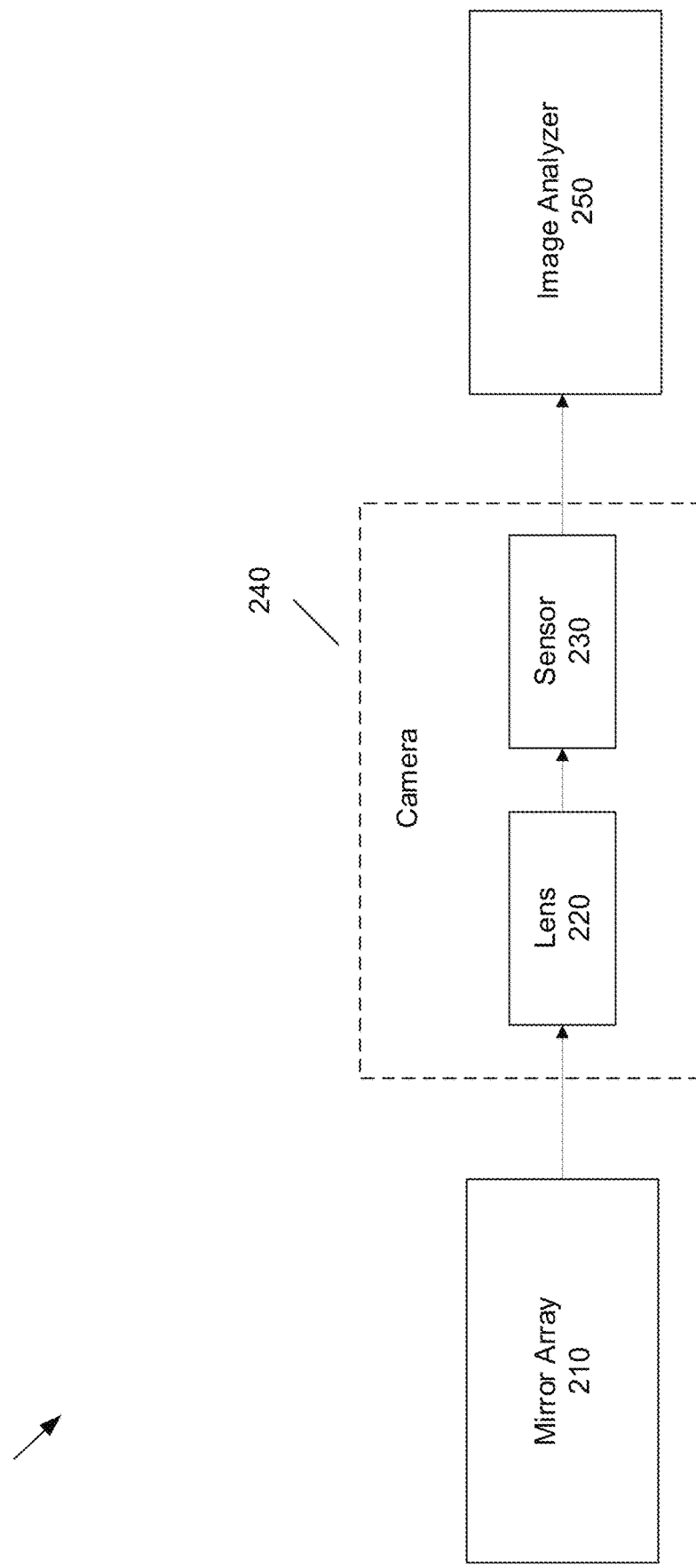
FIG. 2 illustrates a high-level representation of the light field imaging system in accordance with an embodiment of the invention.

A high-level illustration of the light field imaging system in accordance with an embodiment of the invention is illustrated in FIG. 2. In many embodiments, system 200 includes a mirror array 210. System 200 may further include lens 220, and sensor 230. Dimensions of sensor 230 can be mapped onto the focal plane of lens 220. In several embodiments, lens 220 and sensor 230 are housed together in a camera device 240. In some embodiments, the camera device is a QHY600 camera typically used for astrophotography, as it provides a full-frame, back-illuminated sensor with a small pixel size and 16-bit analog-to-digital bit depth. Lens having a wide range of f-number to operate in while targeting reasonable magnification and object distance constraints may be selected. In many embodiments, the choice of lens parameters is restrained to a space where the circle of confusion in imaging is less than half the size of a 100 μm feature. In some embodiments, the lens is a Nikkor Z 58 mm f/0.95 S lens as it is one of the largest aperture lenses available, with a good, well-documented off-axis performance and are also commercially available. One of ordinary skill in the art will appreciate that any number of different lenses and cameras can be used to focus light rays onto the sensor as appropriate to the requirements of specific applications of embodiments of the invention. In selected embodiments, system 200 includes an image analyzer 250 to perform reconstructions of the generated light field images.

Although a specific example of light field imaging system is illustrated in this figure, any of a variety of light field imaging system similar to those described herein as appropriate to the requirements of specific applications in accordance with embodiments of the invention.

Single Folded View

Figure 3A:
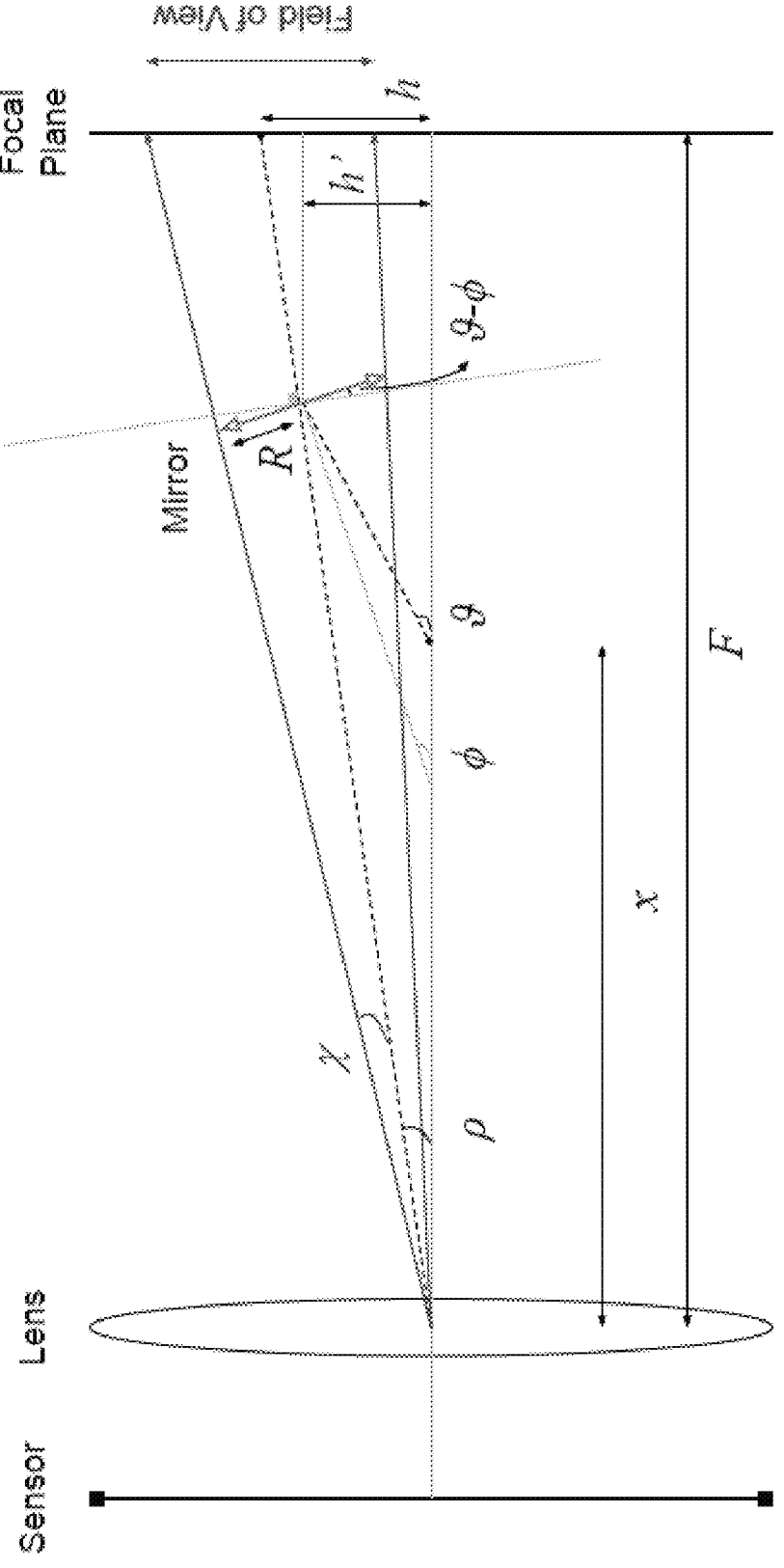
FIGS. 3A-B illustrates a principal ray diagram of a folding method as applied to a single mirror and its image formation geometry in accordance with an embodiment of the invention.

In many embodiments, light field imaging using system 200 relies on folding optical paths using flat mirrors. FIG. 3A illustrates a principal ray diagram of this folding method as applied to a single mirror in accordance with an embodiment of the invention. As shown in FIG. 3A, an object is placed at a distance x from the lens center, offset from the focal plane of the lens which is at a distance F from the lens. A flat mirror is placed between the object and the focal plane, which can produce a virtual object that lies on the focal plane. The virtual object can be focused onto the sensor by the lens. The mirror normal angle φ can be chosen such that the principal (central) ray emanating from the object (at angle θ) is reflected towards the center of the lens.

For a given lens and sensor, the focal plane of the imaging apparatus may be some well defined surface which can be assumed to be flat for the case of an ideal lens. Rather than placing the object at the focal plane directly, the object may be placed closer to the lens and sensor, and a flat mirror can be used to create a virtual copy of the object that sits at the focal plane of the lens. The relative angle between the mirror and optical axis can create a virtual object that may be rotated with respect to the lens and sensor. Light from this virtual object can be focused onto the sensor, along with the light from the object directly that forms a defocused spot on the center of the sensor. Since the focused image on the sensor can be mapped to a specific view angle, this setup can preserve both the intensity and angular information of the light emanating from the object, thereby capturing the light field.

The point of reflection of the principal rays that pass through the lens center can be treated as the center of the mirror, and a symmetrically shaped mirror can ensure that the light cone emanating from the object reflecting off the mirror stays symmetric about the center. Distance between the virtual object and lens can increase by a factor of 1/cos ρ as the virtual object rises above the optical axis. Furthermore, the perpendicular area of the lens aperture (as seen by the virtual object) can decrease by a factor of cos ρ.

Therefore, when the lens is the light-limiting aperture, this can lead to a drop in the light collected from the object as the view gets increasingly off-axis. This effect can be mitigated by using mirrors that function as the light-limiting apertures, and increasing the relevant mirror dimension by the appropriate factor of $1/\cos(\theta-\phi)$ for each mirror. Alternatively, if mirrors of fixed radii are used that form the light-limiting apertures, then a drop in light intensity collected at the lens is expected from similar factors of $\cos(\theta-\phi)$.

The principal ray passing through the center of the lens is denoted by the dashed line in FIG. 3A. For a given view angle $\theta$, the virtual object may sit on the focal plane such that the principal ray can pass through the center of the lens. The mirror normal angle $\phi$, and the position of the mirror center can be determined. The imaging object is placed at a distance x from the lens center, offset from the focal plane of the lens which is at a distance F from the lens. A flat mirror can be placed between the object and the focal plane, which produces a virtual object that lies on the focal plane. This virtual object can be focused onto the sensor by the lens. The mirror normal angle $\phi$ may be chosen such that the principal ray emanating from the object (at angle $\theta$) can be reflected towards the center of the lens. This requirement of the mirror normal angle can place a constraint on the geometry of the mirror and determines the mirror normal angle. In many embodiments, $\theta>0$ view angle results in an image that sees the object as if it were rotated by angle $\theta$ about the optical axis, and $\rho=2\phi-\theta$.

To determine the exact angles of the mirror array, the following equation can to be solved:

$$\frac{\frac{F-x}{2\cos\theta}\sin\theta}{\cos(\theta-\phi)} = h' \tag{1}$$

To solve (1), the height of the point of reflection h' may be required to be consistent when derived from the lens center perspective and from the object's perspective. r=F/x may be used to simplify (1), along with the fact that $\rho=2\phi-\theta$ which is shown geometrically in FIG. 3A. Equation (1) becomes:

$$(r-1)\tan\theta = \left(\sin\rho\left[\frac{r}{\cos\rho}+\frac{1}{\cos\theta}\right]\right) \tag{2}$$

This equation can be solved numerically for $\cos\rho$ for specific values of r and $\theta$. Solving for $\rho$ can fully constrain the mirror parameters $\phi$ and h'.

Figure 3B:
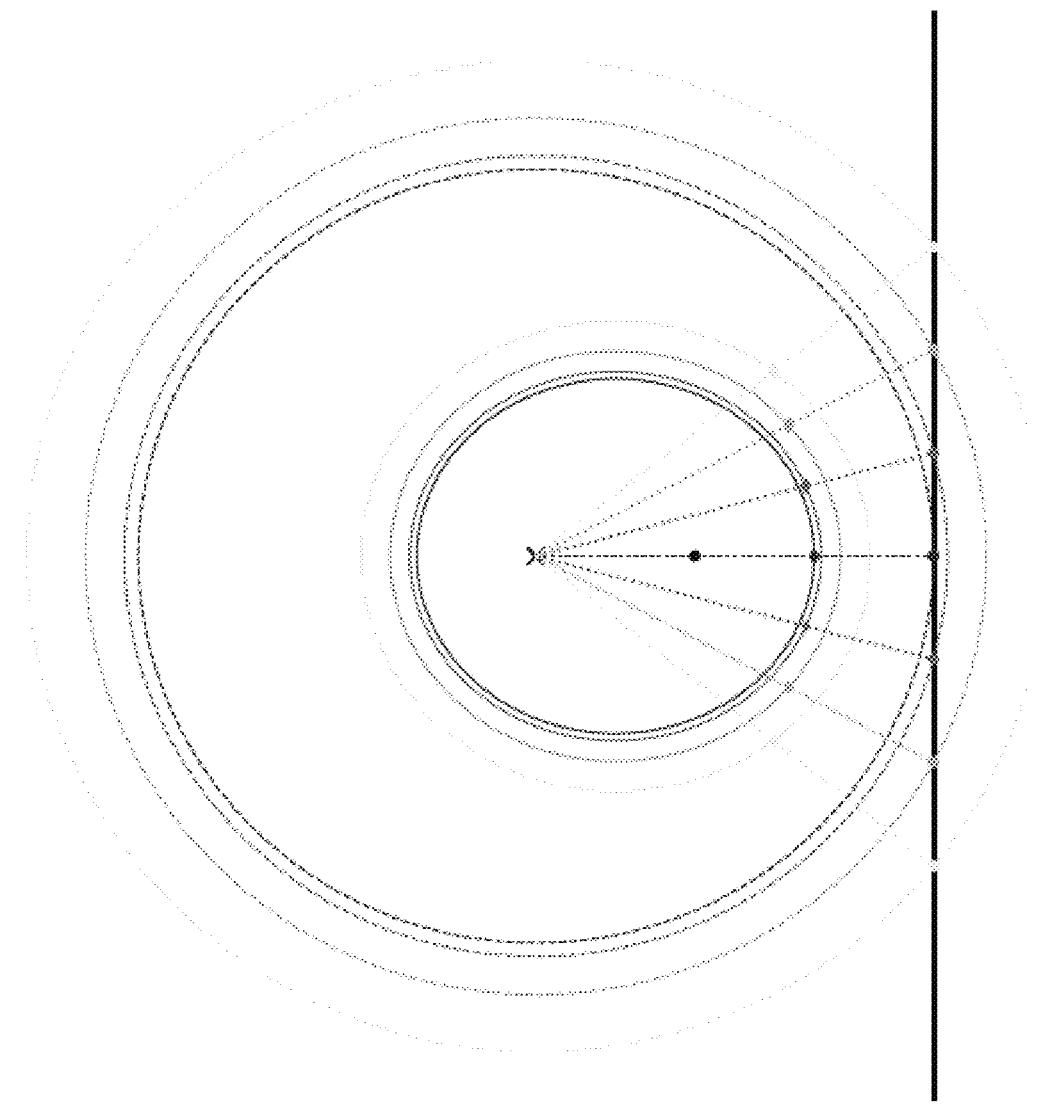

Alternatively, the system can be geometrically solved using the properties of ellipses. FIG. 3B illustrates an image formation geometry for a single folded view used to find both the mirror normal angles and the mirror center positions in accordance with an embodiment of the invention. In some embodiments, the center X marks the location of the lens center and the black dot the location of the object. The solid vertical line on the right may correspond to the plane at which the lens is focused. The ellipses can represent the family of ellipses that have the lens center and object as the two focii. In selected embodiments, the dashed circles are the corresponding circular directrices of the ellipses, centered at the lens center. The diamonds can show the mirror center positions and the dots can show the corresponding virtual object locations at the plane of focus. The dotted lines connect the lens center, mirror centers, and virtual object locations.

For any point on the plane of focus where a virtual image of the object is to be formed, a unique circular directrix from the family of ellipses may pass through that point. The point of intersection of the line between the lens center and the point on the plane of focus, with the ellipse can identify the location of the corresponding mirror center. The normal to the ellipse at the intersection point may correspond to the normal angle of the mirror. This construction can allow for the determination of the mirror parameters given a non-flat plane of focus, since the procedure can also be applied.

The field of view for a single folded view of a single mirror can be geometrically determined by tracing marginal rays from the center of the lens to the edges of the mirror, as shown in FIG. 3A. If the mirror is symmetric about its center, the mirror sizes can be chosen based on the field of view to account for the object of interest, allowing the system to be flexible in its ability to accommodate objects of various scales.

Field of view can be solved by determining the mirror radius projected onto the perpendicular to the central ray direction, $l=R\cos(\theta-\phi)$, and distance between the lens center and the center of the mirror, $$D = \frac{h'}{\sin\rho} = \frac{(F-x)\sin\theta}{2\cos\phi\sin\rho\cos(\theta-\phi)}.$$

These two quantities can be combined to determine x where tan $$x = \frac{l}{D},$$

which can be used to determine the field of view, FoV.

$$\text{FoV}=F[\tan(\rho+x)-\tan(\rho-x)] \tag{3}$$

Two competing effects may define the field of view of the system. First, the mirror can get increasingly inclined towards the optical axis as view angle gets larger, and this results in a reduced field of view footprint by a $\cos(\theta-\phi)$ factor. Second, the mirrors may move further away from the axis as the view angler gets larger to satisfy the constraint for the virtual objects to land on the focal plane. This can result in a larger field of view footprint. Therefore, the field of view variation can contain both a minima, and a diverging field of view as $\theta$ approaches 90°. In many embodiments, the mirror sizes can be chosen based on the field of view to account for the object of interest. Hence, the system can be flexible in its ability to accommodate objects of various scales.

In situations where there are less stringent requirements of light collection, mirror size may remain small. If the scene and/or the target object is illuminated enough, the number of mirrors can increase to obtain more views for better reconstruction. One skilled in the art will be able to appreciate that the size of the mirror and/or the number of mirrors for the light field imaging system may be dependent on the desired resolution of the resulting images. It should be noted that the present disclosure is not limited to any particular arrangement in accordance with embodiments of the invention. Prior knowledge and information of the target object can streamline the process for determining the arrangement and/or the angles of the mirror array.

Multiple Folded Views

Figure 4:
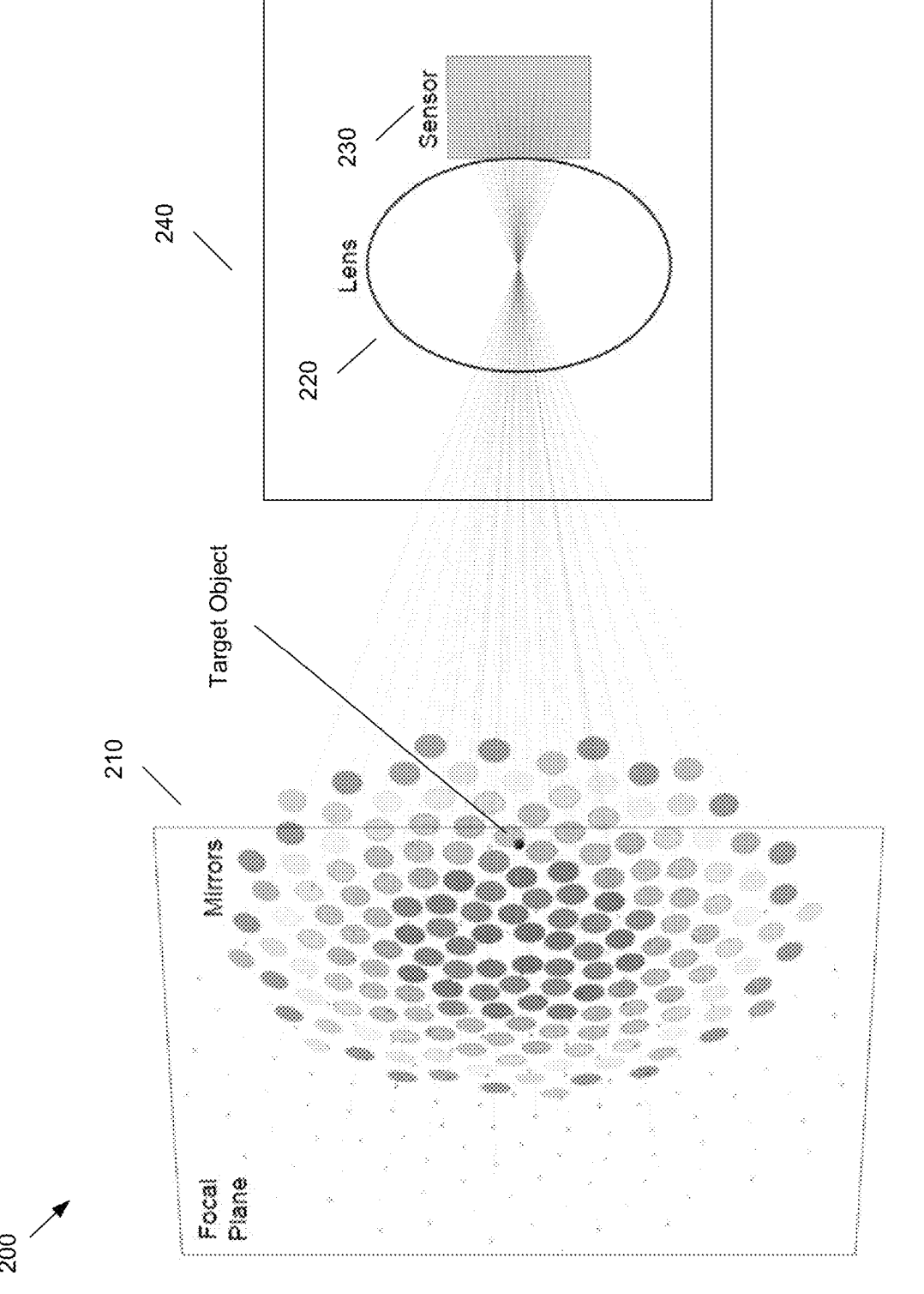
FIG. 4 illustrates a principal ray diagram in a setup with multiple view folding using mirrors in accordance with an embodiment of the invention.

The single view geometry can be extended to a multi view geometry given that the image of each virtual object occupies a small portion of the imaging sensor. A principal ray diagram in a setup with multiple view folding using mirrors in accordance with an embodiment of the invention is illustrated in FIG. 4. The object to be imaged is shown as a dot along the optical axis of the system. The focal plane is depicted here with a bounding box that corresponds to the size of the sensor divided by the lens magnification. It can be seen that for a given array of mirrors, there is some minimum distance between neighboring virtual objects centers. The density of virtual objects on the focal plane can be modified by increasing or decreasing the number of views and mirrors to appropriately account for the virtual object size.

In FIG. 4, the view angles ($\theta$, $\psi$) can be sampled on a Fibonacci lattice as follows, $$(\theta_i, \psi_i) = \left(\cos^{-1}\left[1 - 2\frac{i}{N}\right], 2\pi\frac{i}{GR}\right) \text{ where } GR = \frac{1+\sqrt{5}}{2}, \quad (4)$$

and i=($\frac{1}{2}$+j) where j is an integer from 0 to N, and N is the total number of points being sampled on the Fibonacci lattice. $\theta_i$ correspond to angles with respect to the optical axis, and $\psi_i$ correspond to the azimuthal angles. In the embodiment illustrated in FIG. 4, N=800 angles are sampled on the unit sphere from the lattice, but not all angles are displayed. Only angles in one hemisphere, which upon folding by mirrors produce images that fall inside the sensor, are retained. Flat circular mirrors with equal radii and corresponding normal angles may be appropriately positioned around the object. In many embodiments, the virtual objects are not expected to overlap provided the object dimensions are smaller than the inter-virtual object distance. Moreover, it can be seen that, for this view angle sampling and mirror size, no overlap of ray bundles occurs as the light reaches each mirror.

The maximum view angle shown in the embodiment illustrated in FIG. 4 corresponds to $\theta$=55°, as angles beyond that result in virtual objects that lie outside the field of view of the imaging apparatus. More generally, as $$x = F - \frac{h^*}{\tan \phi^*}, \text{ where} \quad (5)$$

$$\phi^* = \frac{\tan^{-1}\frac{h^*}{F} + \theta^*}{2}$$

if h* corresponds to the maximum height above the optical axis that can be imaged by the lens focused at distance F, then to allow a maximum view angle of $\theta^*$, (5) can determine the corresponding object distance x. No mirrors are placed close to the optical axis to avoid overlapping this defocused image of the object with in focus images produced by folded views.

Figure 5:
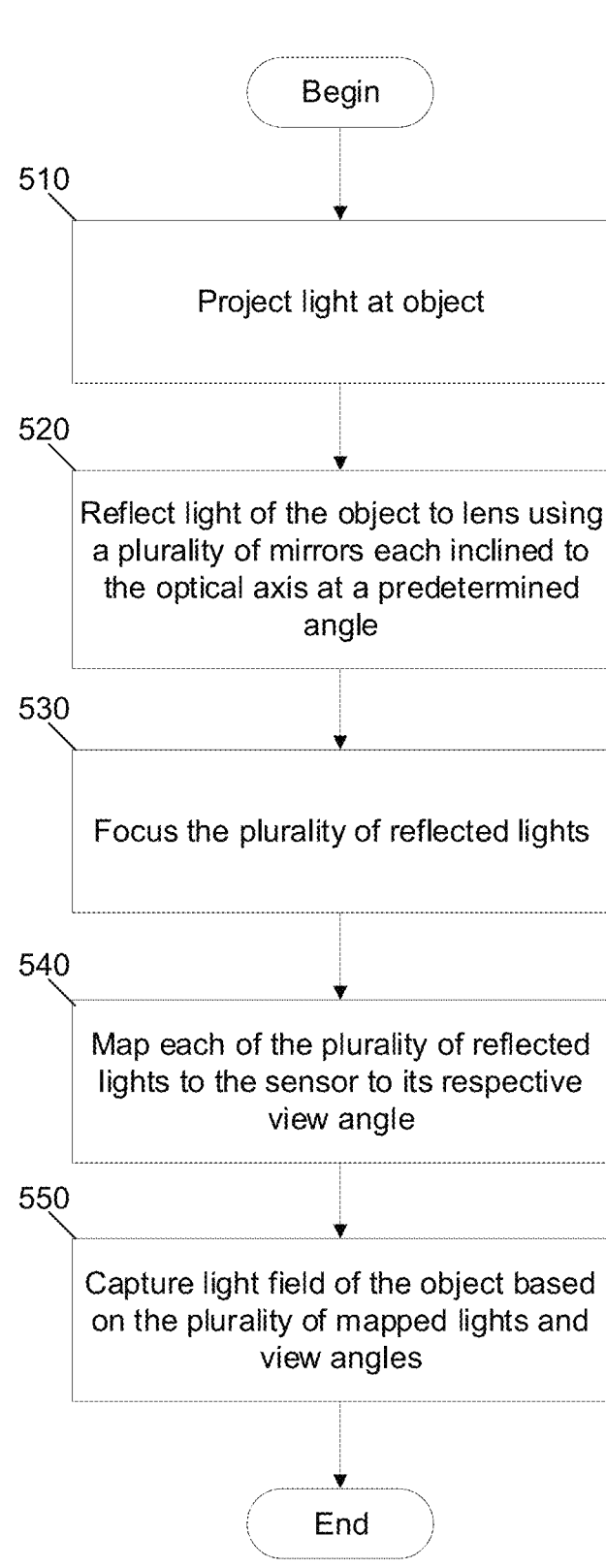
FIG. 5 illustrates a flowchart for a process for performing light field imaging with mirror arrays in accordance with an embodiment of the invention.

A process for performing light field imaging with mirror arrays in accordance with an embodiment of the invention is illustrated in FIG. 5. Process 500 projects (510) light at a target object. Process 500 reflects (520) light of the object to a lens using a plurality of mirrors where each of the plurality of mirrors are inclined to the optical axis at a certain predetermined angle. In many embodiments, virtual objects of the target object are reflected to the lens in step 520. Process 500 focuses (530) the lights reflected from each of the plurality of mirrors. Step 530 can focus all the virtual objects reflected to the lens. Process 500 maps (540) each of the plurality of reflected lights to a sensor at its respective view angle. Process 500 captures (550) light field of the object based on the mapped lights and view angles.

While specific processes for performing light field imaging with mirror arrays are described above, any of a variety of processes can be utilized to perform light field imaging with mirror arrays as appropriate to the requirements of specific applications. In certain embodiments, steps may be executed or performed in any order or sequence not limited to the order and sequence shown and described. In a number of embodiments, some of the above steps may be executed or performed substantially simultaneously where appropriate or in parallel to reduce latency and processing times. In some embodiments, one or more of the above steps may be omitted.

Reconstruction

Figure 6:
FIG. 6 illustrates a flowchart for a process for calibrating the mirror arrays in accordance with an embodiment of the invention.
Figure 6:
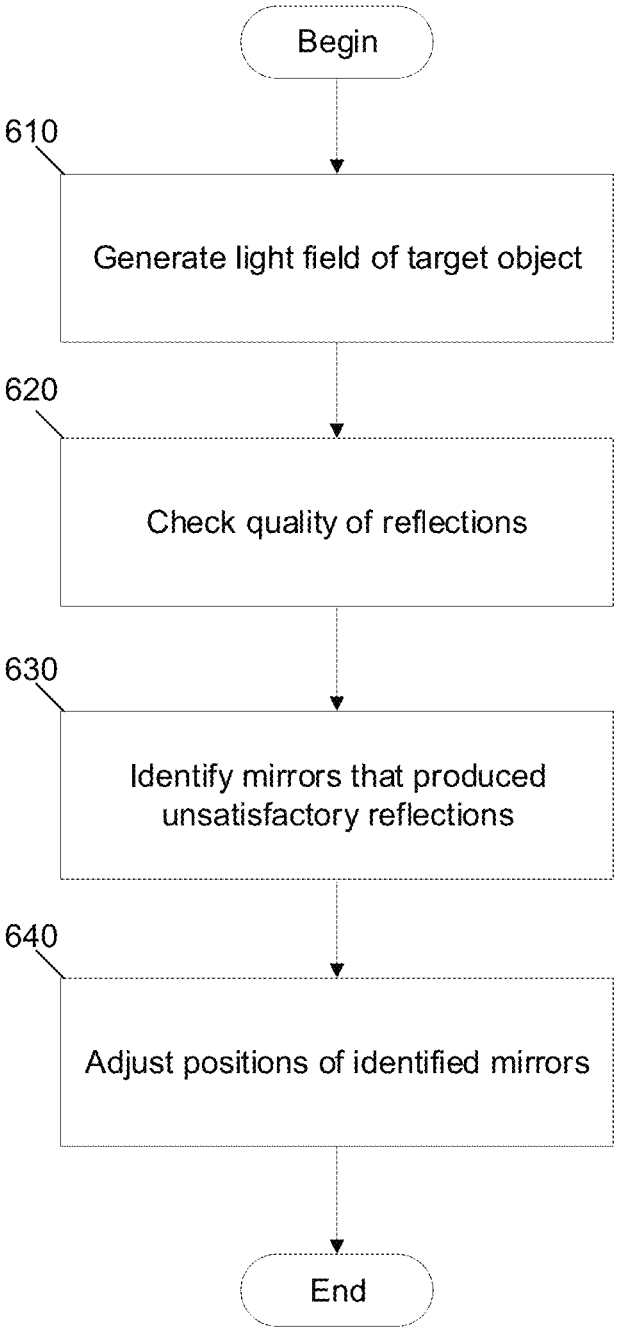

A process for calibrating the mirror arrays in accordance with an embodiment of the invention is illustrated in FIG. 6. Process 600 generates (610) a light field of a target object. Process 600 checks (620) the quality of the reflections from each mirror of the mirror array. Process 600 identifies (630) mirrors in the mirror array that produced unsatisfactory reflections. In many embodiments, the reflections are unsatisfactory if they are too dark, or if the mirrors are misaligned. Process 600 adjusts (640) the positions of the identified mirrors.

While specific processes for calibrating the mirror arrays are described above, any of a variety of processes can be utilized to perform light field imaging with mirror arrays as appropriate to the requirements of specific applications. In certain embodiments, steps may be executed or performed in any order or sequence not limited to the order and sequence shown and described. In a number of embodiments, some of the above steps may be executed or performed substantially simultaneously where appropriate or in parallel to reduce latency and processing times. In some embodiments, one or more of the above steps may be omitted.

Figure 7:
FIG. 7 illustrates a flowchart for a process for reconstructing images using captured light fields in accordance with an embodiment of the invention.
Figure 7:
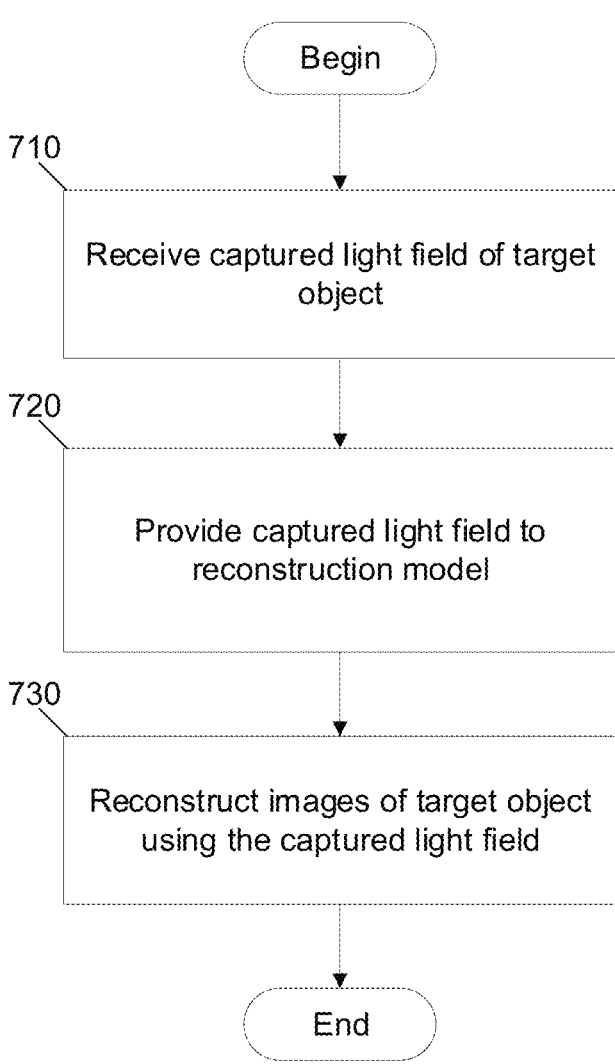

A process for reconstructing images using captured light fields in accordance with an embodiment of the invention is illustrated in FIG. 7. Process 700 receives (710) a captured light field of a target object. Process 700 provides (720) the captured light field to a set of reconstruction models. Process 700 reconstructs (730) images of the target object using the captured light field. In some embodiments, the model used to reconstruct the surfaces of the target object a NeuS model. A NerF++ model may be used to reconstruct the background of the target object. One of ordinary skill in the art will appreciate that any number of models can be used to reconstruct images of the target object as appropriate to the requirements of specific applications of embodiments of the invention.

While specific processes for reconstructing images using captured light fields are described above, any of a variety of processes can be utilized to perform light field imaging with mirror arrays as appropriate to the requirements of specific applications. In certain embodiments, steps may be executed or performed in any order or sequence not limited to the order and sequence shown and described. In a number of embodiments, some of the above steps may be executed or performed substantially simultaneously where appropriate or in parallel to reduce latency and processing times. In some embodiments, one or more of the above steps may be omitted.

In many embodiments, the system includes a flexible optics and light transport simulation framework for analysis and reconstruction of light field images captured using methods discussed above. In several embodiments, the framework is based on geometric optics, which automatically simulates effects such as depth of field, and can also incorporate point spread functions and modulation transfer functions in the imaging process. The simulator can be thought of as a mapping $S_\theta:\rho(x) \mapsto \to y$, where $\theta$ is a set of parameters of the imaging system including but not limited to the mirror positions/angles and the lens focal length. The target object $\rho(x)$ may be densities dependent on 3D spatial coordinates $x \in R3$, which may be represented by analytical functions, voxels, meshes, or neural networks. The outputs, $y \in R2$, may be images captured by a user-defined optical setup. In some embodiments, the framework is fully differentiable, and allowing for gradient-based reconstruction of the simulation inputs via gradients with respect to parameters of $\rho(x)$ and gradient-based calibration via gradients with respect to $\theta$.

In many embodiments, a view $v_i$ is defined as the object image corresponding to a mirror $m_i$. A H×W pixel patch from the full image captured by the camera, where H and W are respectively the height and width of the patch in pixels may be supplemented. For a given image y, a set of n such folded views may be extracted with a patch finding algorithm, yielding a dataset $D=\{v_i\}_{i=1}{}^n$, where each view is a set of pixels j, k together with their measured intensity $I_{i,j}$, that is $v_i=\{j_i,k_i,I_{j_i,k_i}\}_{j,k=1}{}^{H*W}$. Such views may be matched to the corresponding views in simulation. In many embodiments, the purpose of reconstruction is to learn a 3D input model $\rho(x)$ for the simulator such that the corresponding simulation output y closely matches the captured image. Specifically, for simulated intensities $S_\theta (\rho(x))_{j,k}$ at pixels j,k and target intensities $I_{j,k}$, $$\arg\min_{\rho(x)} \sum_i \sum_{j_i} \sum_{k_i} \left\| S_\theta\big((\rho(x))_{j_i,k_i} - I_{j_i,k_i}\big) \right\|_2^2$$

can be optimized with gradient descent, where the sums are over views and pixels in each view.

Target objects may be represented as their densities using neural networks. The weights of the neural network can be optimized with gradient descent with the procedure described above so that the neural network can model the density of the target volume after training. In some embodiments, models that uses neural networks with sinusoidal activation functions to learn high quality volumetric signals can be used to model 3D densities. In several embodiments, surfaces of target objects that are sharply defined are modeled with NeuS model. NeuS can represent a surface via two neural networks: a signed distance function (SDF) and a view dependent color. The learned SDF can be used to construct a density highly peaked about its 0 value (the learned surface), and resulting views are constructed via standard volumetric rendering with this highly peaked density. In selected embodiments, the neural network predicting view dependent color is needed due to the non-uniform illumination of the object. direction for future work.

Figure 8:
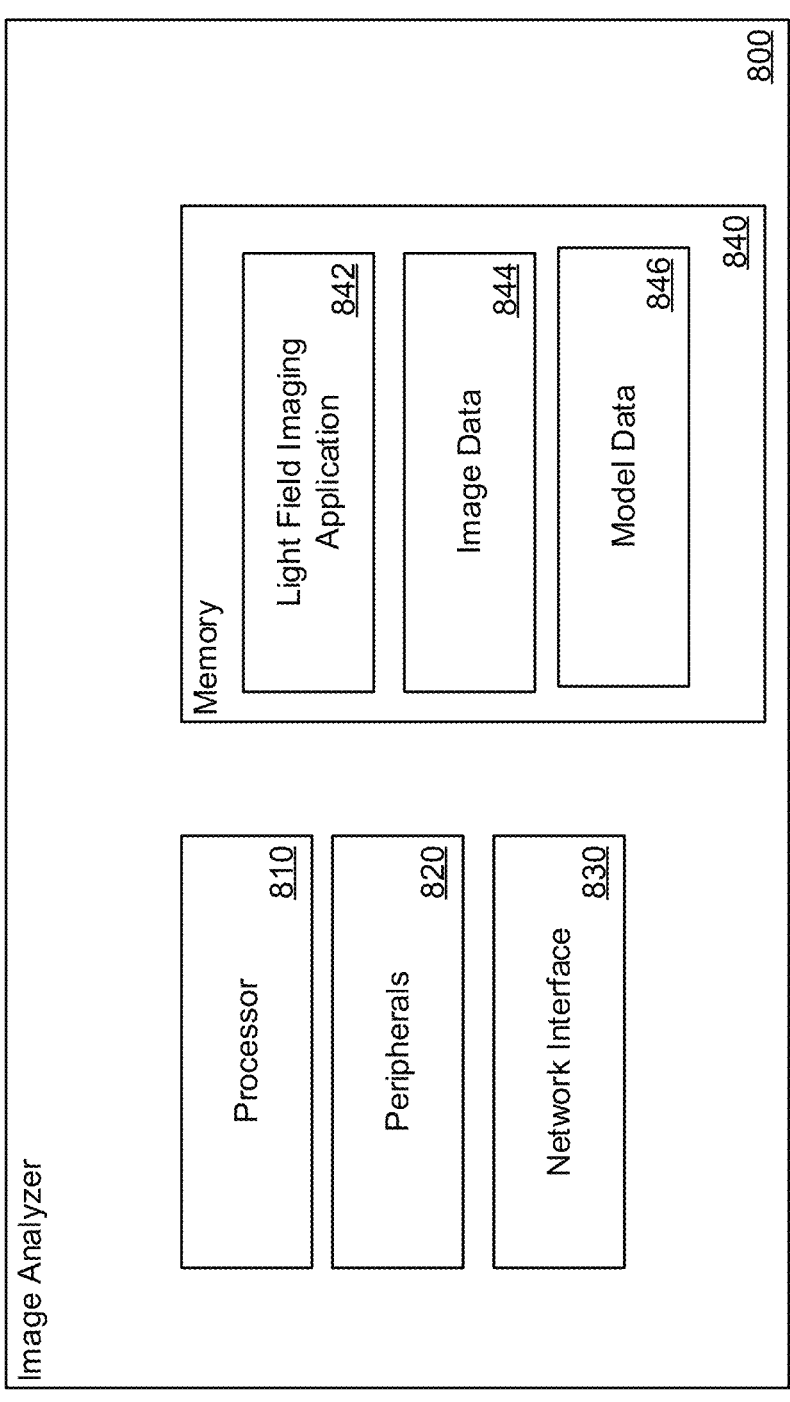
FIG. 8 is a high-level block diagram of an image analyzer for reconstructing images of target objects to be implemented on in accordance with an embodiment of the invention.

An example image analyzer for reconstructing images of target objects in accordance with an embodiment of the invention is illustrated in FIG. 8.

Image analyzer 800 includes a processor 810. Processor 810 may direct the light field imaging application 842 to reconstruct images of target objects based on light fields captured and stored in image data 844 using reconstruction models stored in model data 846 in accordance with several embodiments of the invention. In many embodiments, processor 810 can include a processor, a microprocessor, controller, or a combination of processors, microprocessor, and/or controllers that performs instructions stored in the memory 840 to reconstruct images. Processor instructions can configure the processor 810 to perform processes in accordance with certain embodiments of the invention. In various embodiments, processor instructions can be stored on a non-transitory machine readable medium. Peripherals 820 may be used by participants to control the reconstruction process. Image analyzer 800 further includes a network interface 830 that can receive content for reconstruction, and a memory 840 to store the images under image data 844 and reconstruction models under model data 846. One skilled in the art will recognize that the image analyzer may exclude certain components and/or include other components that are omitted for brevity without departing from this invention.

Although a specific example of an image analyzer is illustrated in this figure, any of a variety of image analyzers can be utilized to reconstruct images of target objects similar to those described herein as appropriate to the requirements of specific applications in accordance with embodiments of the invention.

Example Reconstruction

Figure 9:
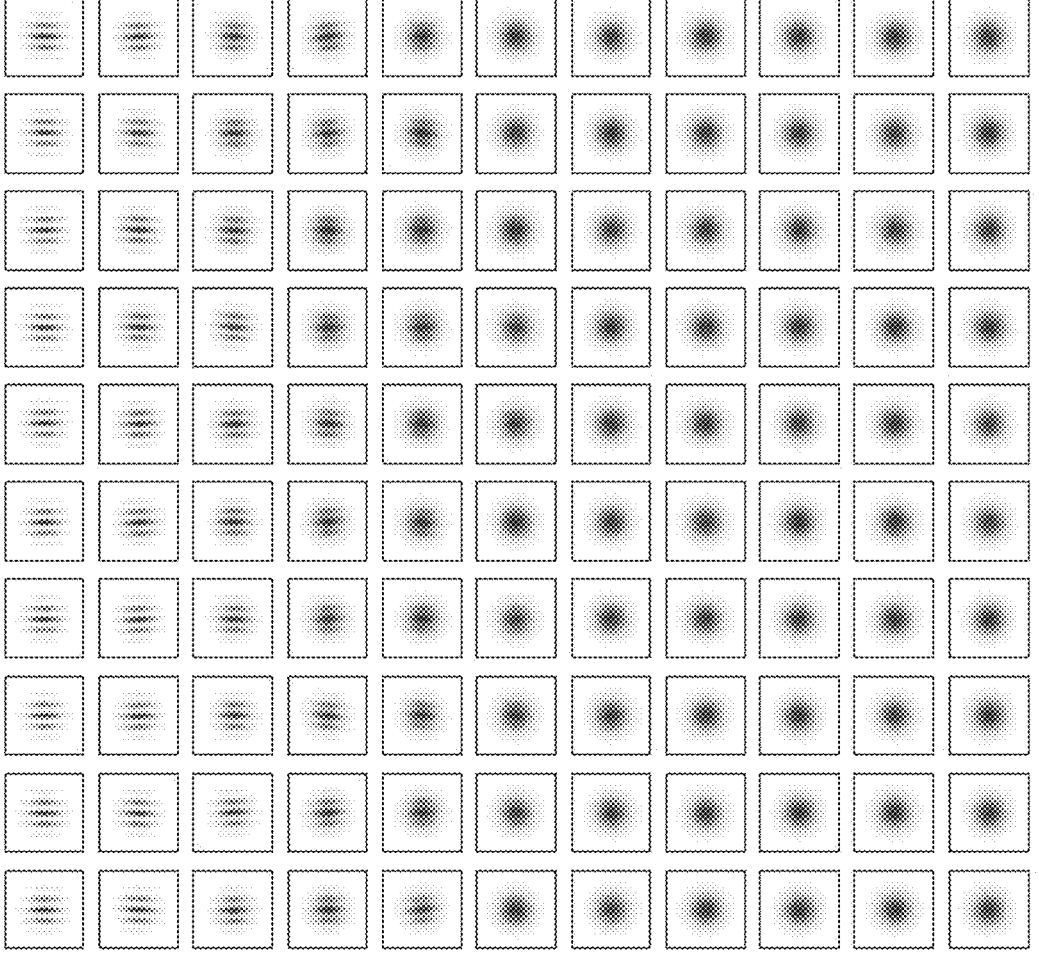
FIG. 9 illustrates a grid of views extracted from a simulated light field 60-megapixel image of an atom cloud imaged over 10 μs in accordance with an embodiment of the invention.

FIG. 9 illustrates a grid of views extracted from a simulated light field 60-megapixel image of an atom cloud imaged over 10 µs in accordance with an embodiment of the invention. The atom cloud has a sine-wave density modulation fringe pattern, and the number of atoms is sampled from a Poisson distribution with $\lambda=106$ atoms, where each atom emits 108 photons per second. 110 out of 111 views extracted from a simulated light field image were used for the reconstruction.

Figure 10:
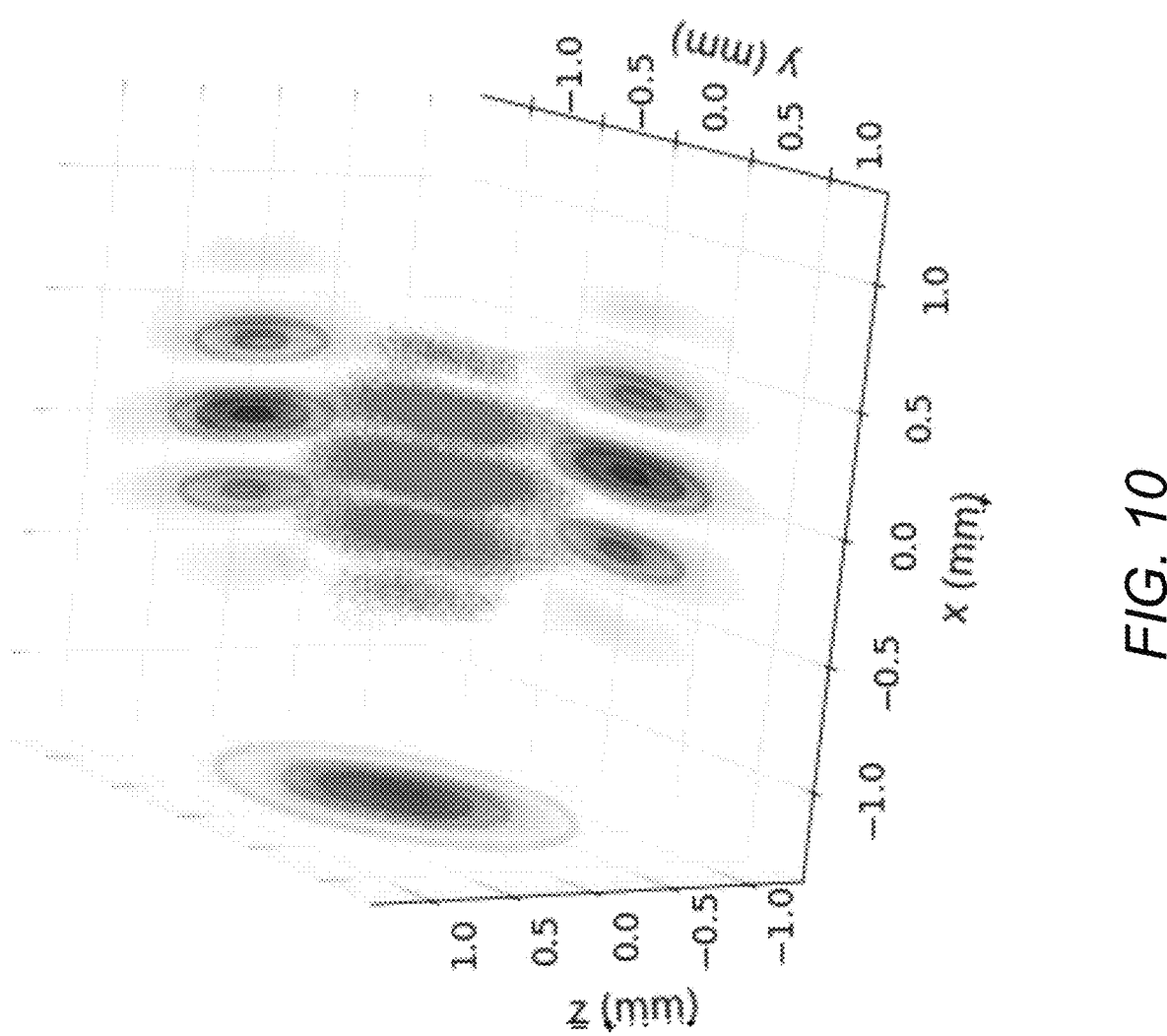
FIG. 10 illustrates data sampled from a learned 3D cloud model, a learned 2d marginals, and the contour lines of the target density in accordance with an embodiment of the invention.

FIG. 10 illustrates data sampled from a learned 3D cloud model, a learned 2 d marginals, and the contour lines of the target density. For reconstruction, the atom cloud density was modeled with a neural network and use the views from FIG. 9 in order to train it. FIG. 10 shows the learned density after training the neural network for 5,000 epochs. It can be observed that the input views acquired in a single shot allow for accurate reconstruction the atom cloud without using domain knowledge or regularization.

Figure 11:
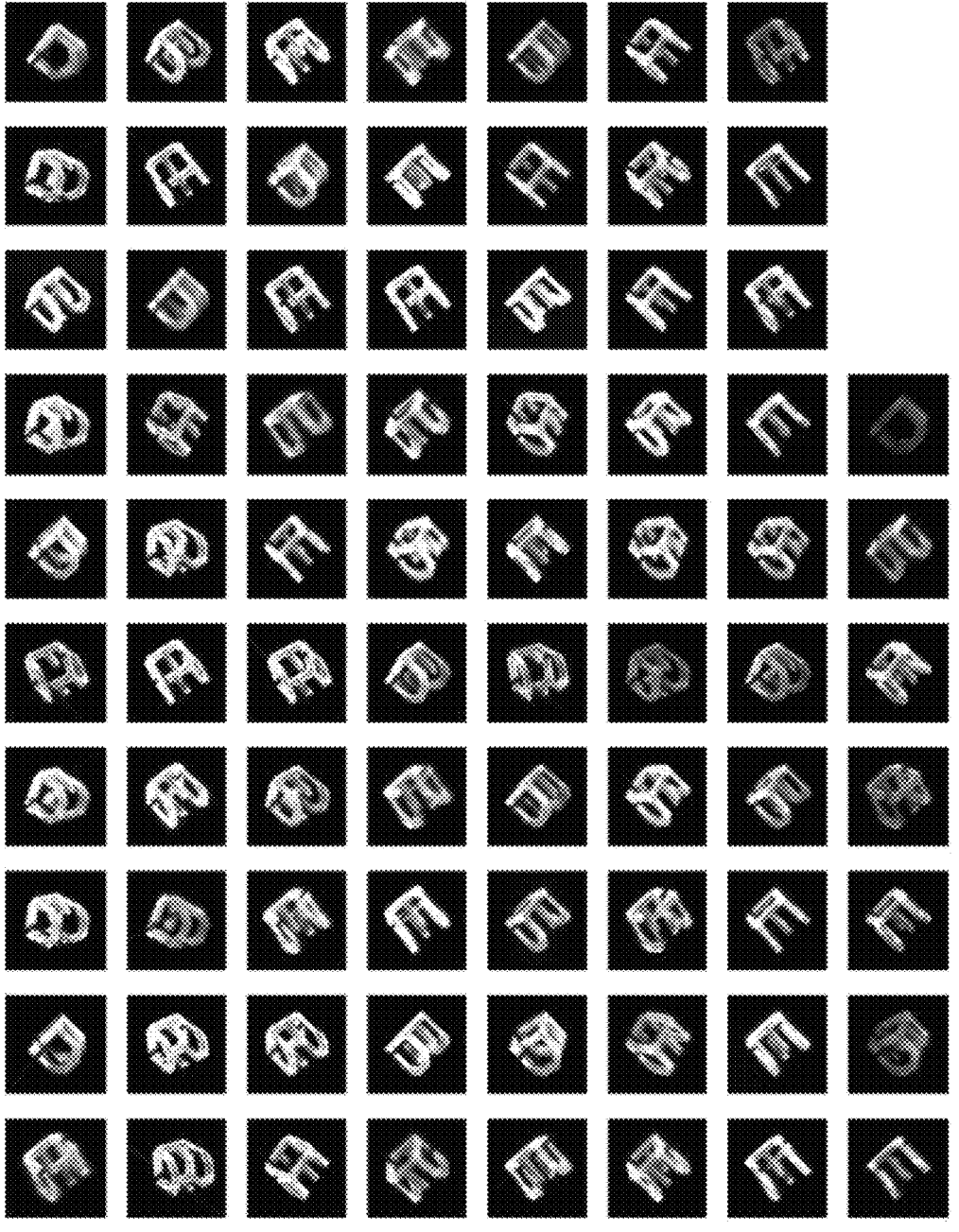
FIG. 11 illustrates a set of views used for training for the reconstruction in accordance with an embodiment of the invention.

Images captured through the mirror array are of 9600× 6422 pixels, with an embedded set of views of the imaged object (nominally n views for n mirrors in the device). As mirrors within the constructed imaging apparatus may differ slightly from the expected position due to imperfect construction or alignment, mirrors in simulation and observed data must be matched before per-view comparisons can be performed. A patch finding algorithm was ran based on the contour and rectangle finding tools in OpenCV to extract H×W pixel patches corresponding to each view. Expected view positions for each mirror are found in simulation by tracing a ray from the expected object position to each mirror center, and following this ray to its intersection with the sensor. These intersection points are compared with the view centroids found by the patch finding, and the centroid closest to the ray intersection point from a given mirror is identified as the view corresponding to that mirror. FIG. 11 illustrates the set of views used for training for the reconstruction results. Out of the 90 views generated through the mirror array, 86 views are found by the patch finding, with the others falling below a small intensity threshold. To ensure a good match with simulation, a threshold of 350 pixels is set on the distance between patch centroid and the corresponding mirror position matched as described above. With this threshold, 82 views are available for reconstruction. While running a reconstruction is feasible with these 82 views, quality is improved by discarding an additional 5 views which are poorly centered (from a shifting in the bounding box due to illumination of the suspending thread) or poorly illuminated.

Figure 12:
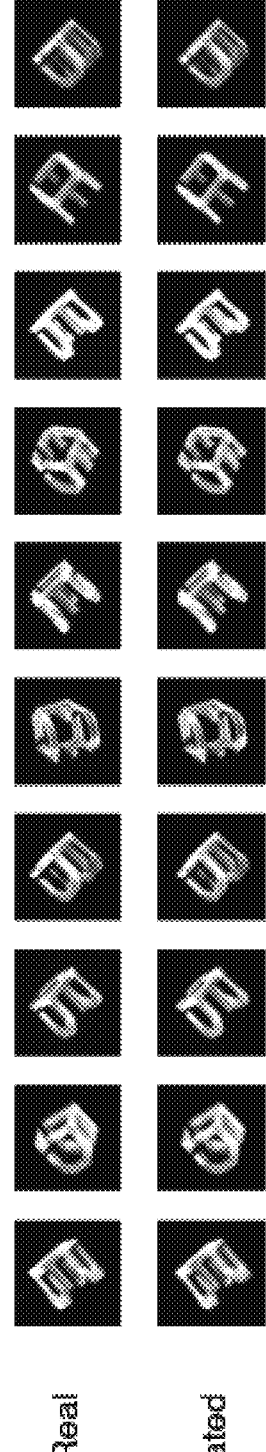
FIG. 12 illustrates a comparison between a subset of real views with the corresponding views generated from a learned NeuS model in accordance with an embodiment of the invention.

For the purposes of reconstruction, the patch in data is assumed to be at the corresponding nominal position from simulation; namely the set of H×W pixels centered at the expected view position described above. These patches, with the corresponding identified mirrors and pixel positions, are used as the inputs for the reconstruction. In some embodiments, patches of 130×130 pixels are used. An NeuS reconstruction model is trained for 100000 iterations on the views shown in FIG. 11, where a training iteration corresponds to a sampling of 512 pixels from a view, within a sweep across randomized views. No explicit masking, i.e. supervised information about the object location in each view, is used and the distinction between foreground and background is learned. Following the NeuS implementation, the background is modeled by NeRF++. FIG. 12 illustrates a comparison between a subset of real views with the corresponding views generated from the learned NeuS model in accordance with an embodiment of the invention. It can be observed that the results are nearly identical between the real and generated images, with an average structural similarity index (SSIM) across training views of 0.98 (1 is perfectly identical, 0 is no similarity), demonstrating the good convergence of this trained model.

Figure 13:
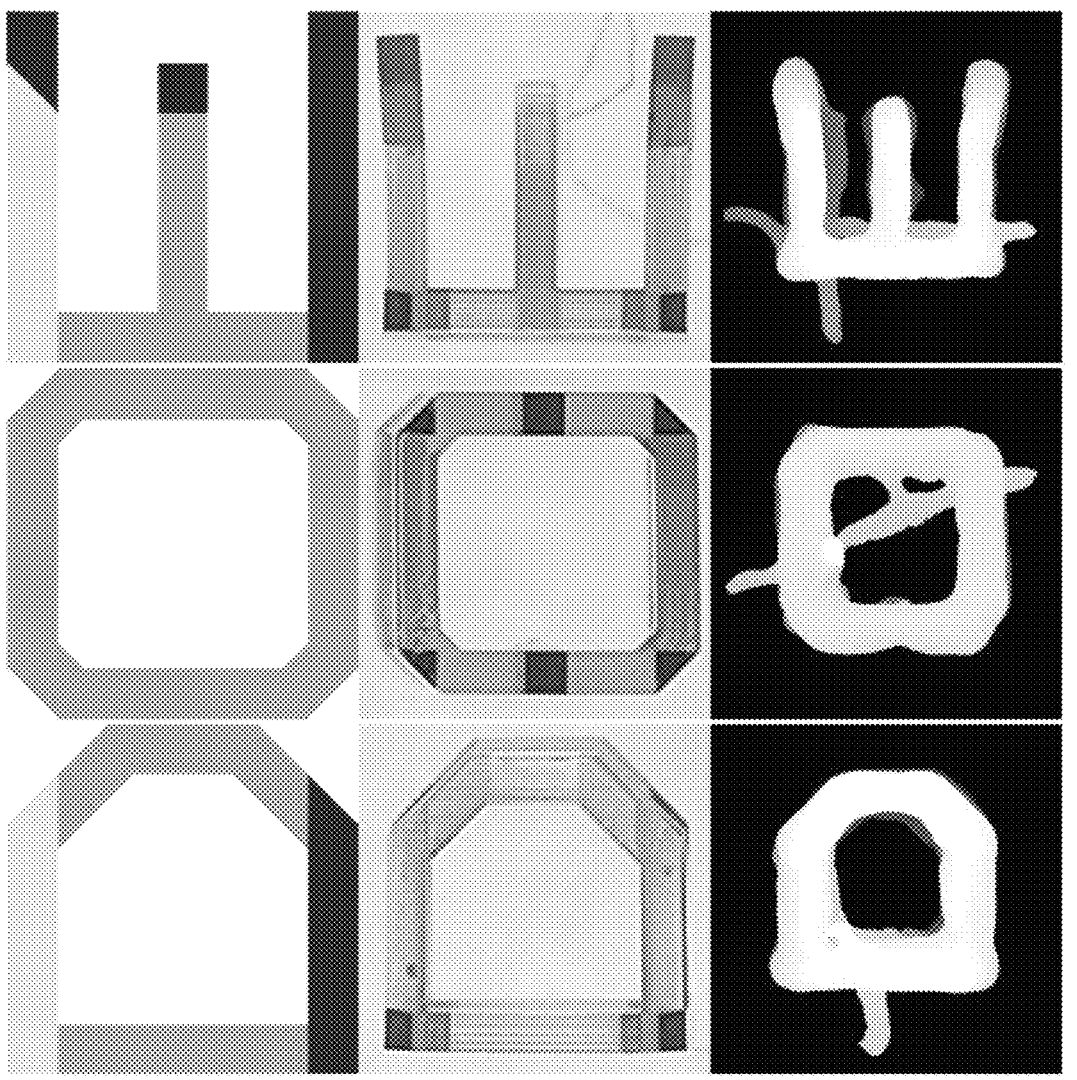
FIG. 13 illustrates orthographic depth maps of three letters D, O and E from a learned surface compared to the corresponding CAD model and microscope image in accordance with an embodiment of the invention.
Figure 14:
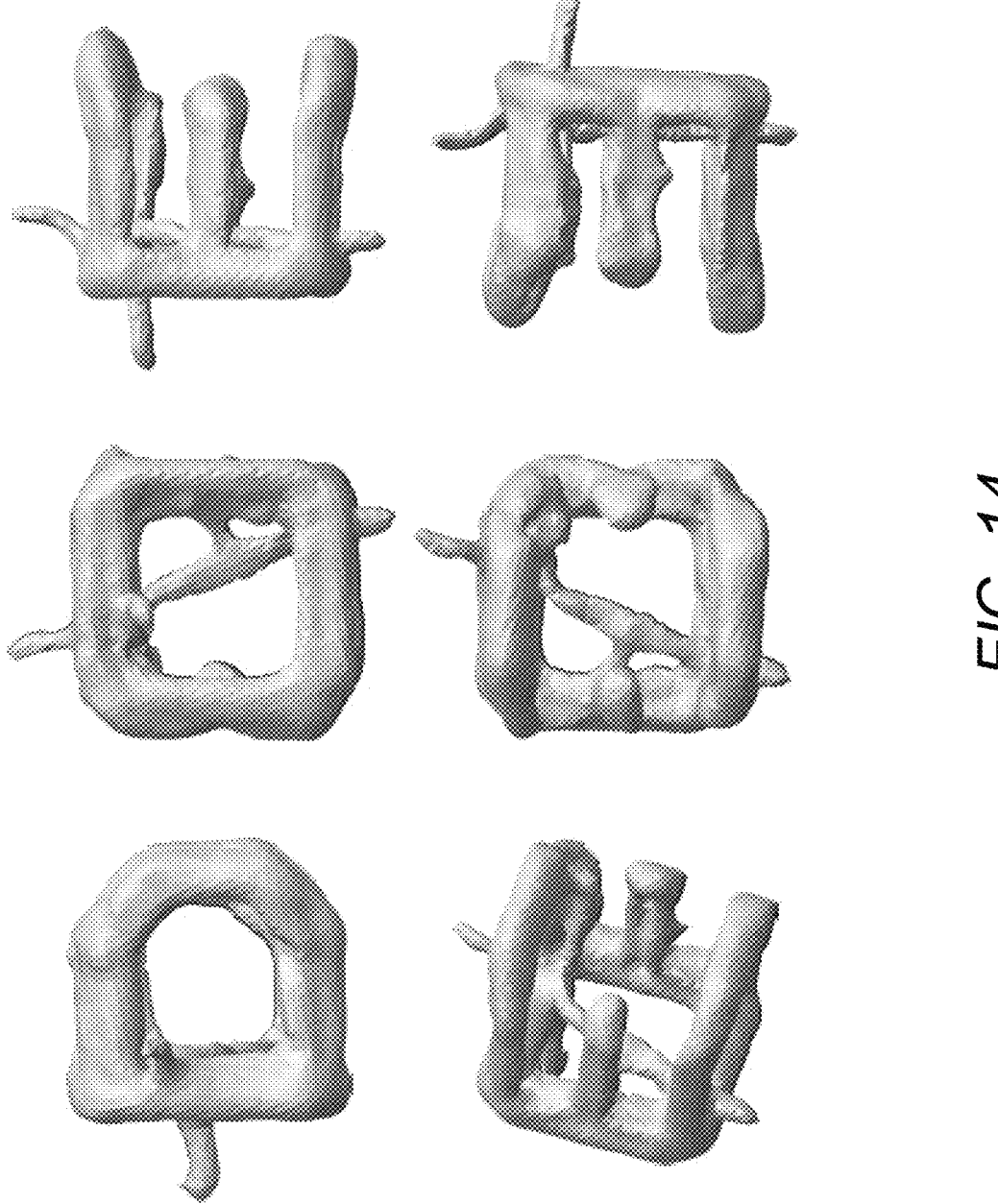
FIG. 14 illustrates a surface mesh for the three letters at different angles in accordance with an embodiment of the invention.
Figure 15:
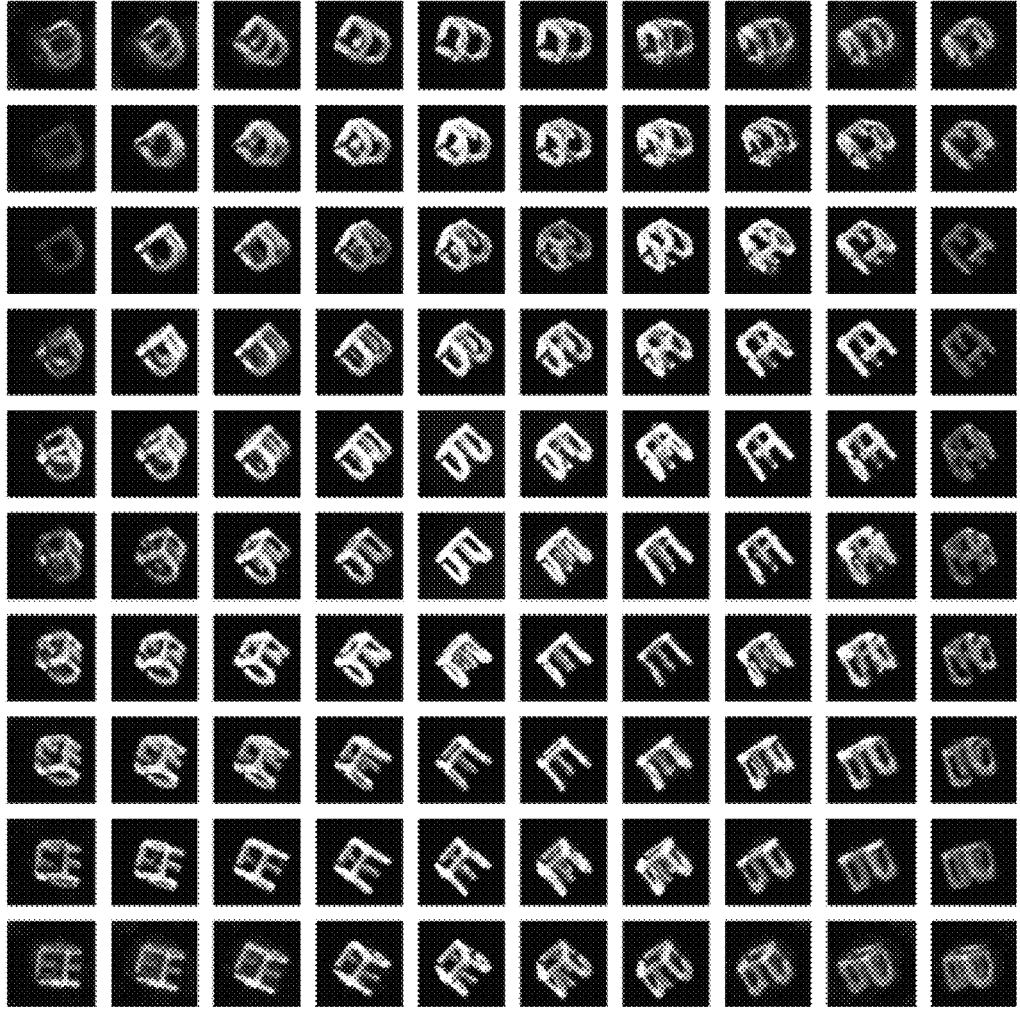
FIG. 15 illustrates a set of interpolated views generated from the learned NeuS reconstruction in accordance with an embodiment of the invention.

For the reconstruction of a three-dimensional object, a zero-level set of the learned signed distance function (SDF) was analyzed to study the learned 3D surface. The learned SDF is sampled in a regular grid of 643 points within a box of 2.02 mm per side centered at the nominal object position, with this sampling grid chosen to roughly match the anticipated resolution. A marching cubes algorithm within the trimesh software is then used to construct a triangular mesh of the learned surface. FIG. 13 illustrates orthographic depth maps of three letters D, O, and E from this learned surface are compared to the corresponding CAD model and microscope image. FIG. 14 illustrates the surface mesh for the three letters at different angles, demonstrating the true 3D structure of the learned surface. The object is reconstructed with high fidelity, with very clear lettering as well as more minute structure, such as the bowing out of the legs of the letter E. The reconstruction also learns the 120 µm thread used to suspend the DOE object in front of the device, showing that the reconstruction does suffer in regions where there is minimal information in the training views.

Information about the learned three-dimensional surface may be fully contained in the signed distance function, and can be visualized using colorless meshes. A set of views from various positions on a sphere centered at the nominal object position was sampled to analyze the learned color as an insight into the learned light field, especially in our case of imperfect illumination. Views are sampled in an even grid of angles between −55 and 55 degrees measured both vertically and horizontally from the optical axis. FIG. 14 illustrates a set of interpolated views generated from the learned NeuS reconstruction. The inputs to the reconstruction are a set of rays generated at the center of the device. This set of rays is then rotated around the vertical (x-axis of the grid) and horizontal (y-axis of the grid) axes, centered on the nominal object position, and the resulting reconstruction from each set of rotated rays is shown. The range of rotation angles is between −55 and 55 degrees, and resulting views contain no explicit correspondence to those used for training.

The quality of each of these views is high and realistic, demonstrating a physically meaningful learned 3D structure and light field. The center of the grid corresponds to the center of the device and is correspondingly the brightest, while the edges of the grid correspond to regions on the outer edge/outside of the device, and the learned intensity is correspondingly dimmer.

Figure 16:
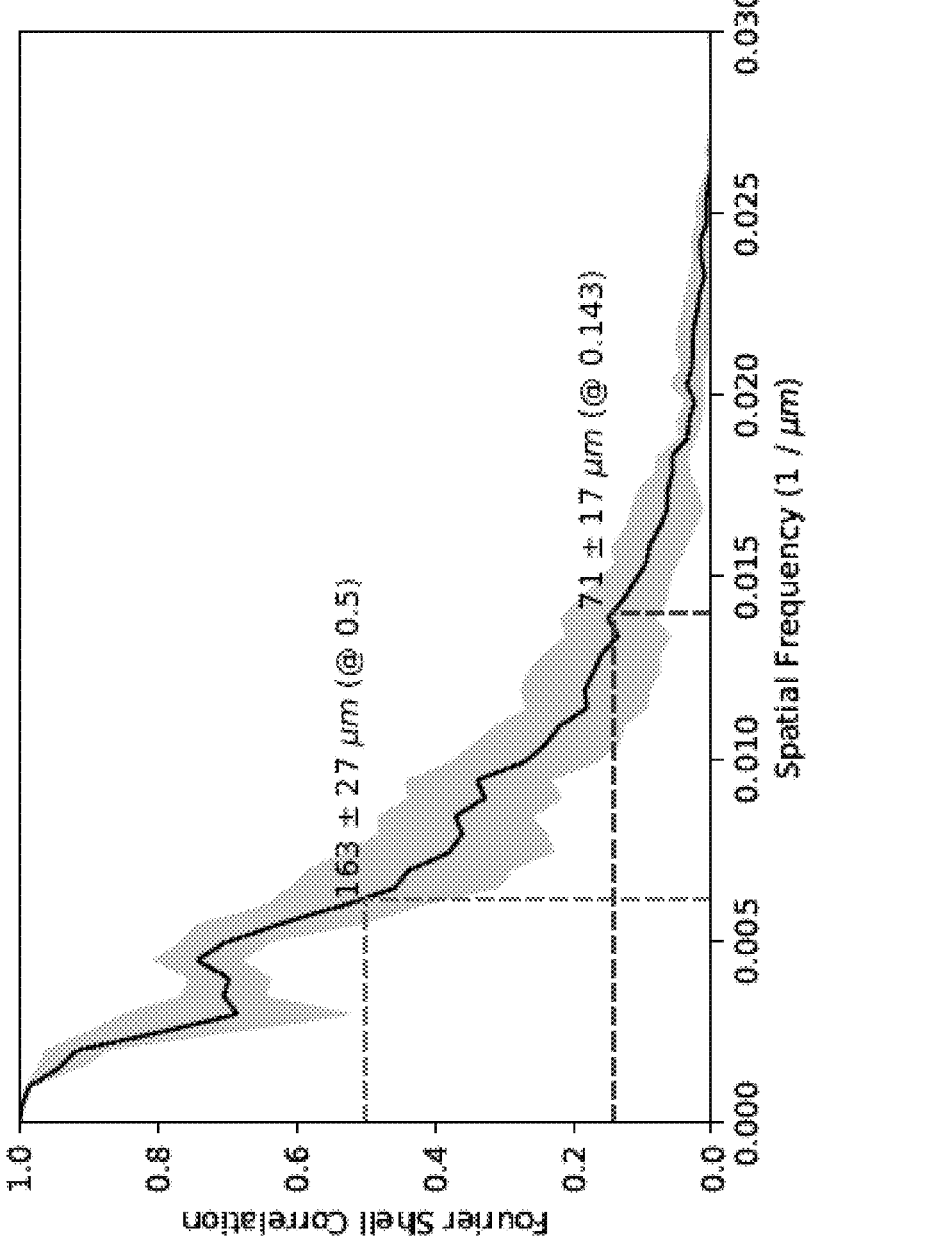
FIG. 16 illustrates a Fourier shell correlation curve for a reconstructed DOE object in accordance with an embodiment of the invention.

The reconstructed features shown in the above figures demonstrate the ability of the system to reconstruct both the 142 µm DOE letters and the 120 µm thread, providing a qualitative measure of resolution for the system with the chosen reconstruction algorithm. The Fourier shell correlation (FSC) can be used to further quantify the resolution of the system. FSC is a metric used extensively in several other contexts, including cryogenic electron microscopy, which compares the correlation between two volumes as a function of spatial frequencies. Pure signal corresponds to perfect correlation, or a FSC at 1 for all frequencies, while pure noise corresponds to no correlation, or a FSC at 0 for all frequencies. FIG. 16 illustrates a Fourier shell correlation curve for the reconstructed DOE object in accordance with an embodiment of the invention with error bars derived from running this procedure with various random splits. 77 extracted views are randomly split into two distinct halves, and each half is separately reconstructed. All reconstructions are trained for 140000 iterations, and the Fourier shell correlation is calculated by comparing logistic densities of learned width centered at the learned surfaces. Results shown are the mean and standard deviation calculated from running this procedure across 5 different random splits of the 77 views. Resolutions are quoted for two commonly used thresholds, with 71±17 µm resolution corresponding to the standard threshold used for split dataset comparisons. Results are qualitatively consistent with the size of reconstructed features.

Figure 17:
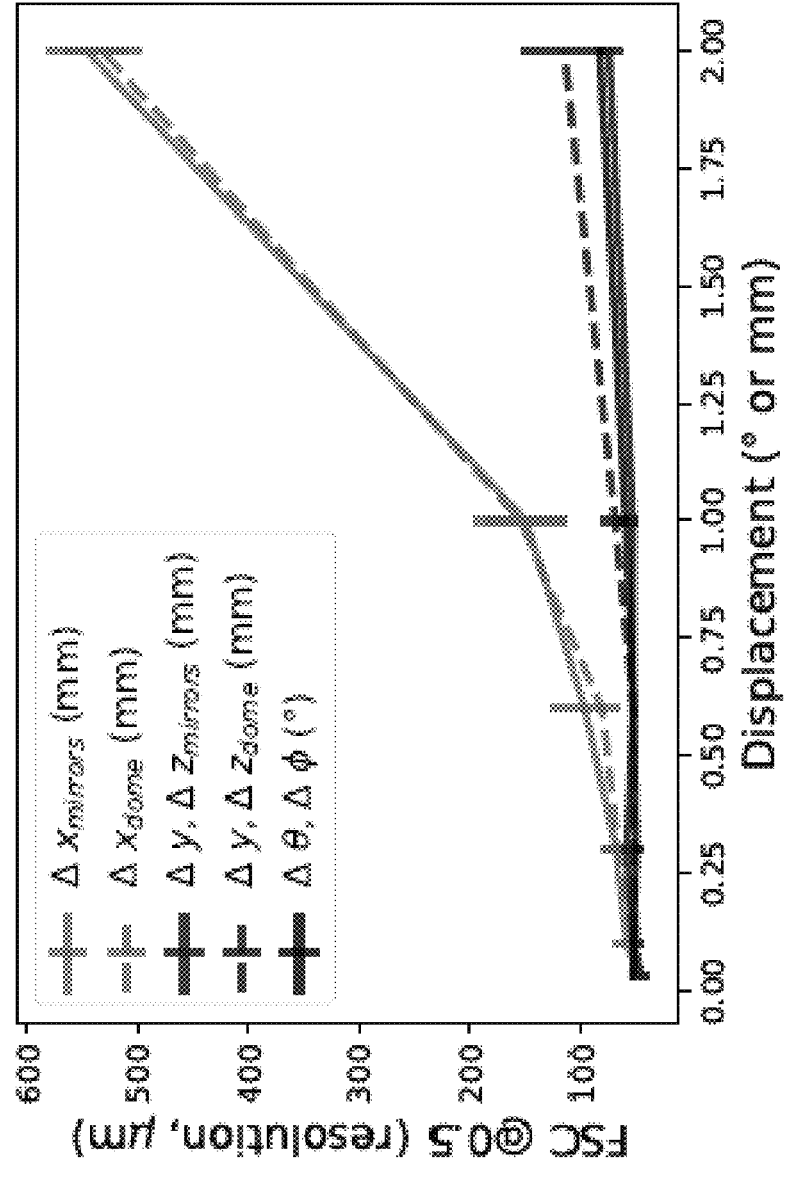
FIG. 17 illustrates the resolution of the system as a function of misalignment and 3D printing error in accordance with an embodiment of the invention.

FIG. 17 illustrates the resolution of the system as a function of misalignment and 3D printing error. The resolutions were obtained by computing the Fourier shell correlation between the ground truth and the 3D reconstructed models of the test object. Without calibration of the simulator, displacements below 0.6 mm or 2° can still allow for reconstruction of 100 µm features.

One of ordinary skill in the art will appreciate that the set of reconstruction parameters may be varied as appropriate to the requirements of specific applications of embodiments of the invention based on factors including but not limited to the number and size of mirrors, target object, and optical hardware selection.

Quality Control Using Light Field Imaging

The light field imaging system is capable capturing the light intensity emanating from the object and factorize it into different directions, effectively capturing the light field of the object. This gain in information, along with the gain in light collection, can be crucial to the usefulness of the image captured by this device in reconstruction. In numerous embodiments, the light field imaging system can perform one shot 3D reconstruction and characterization of small-scale objects that in environments that are dim where the objects may be fragile, or ephemeral.

In many embodiments, the light field imaging system can be integrated into 3D printing systems as an automatic quality control apparatus. Quality control of mass-printed or mass-produced items generally undergo spot checks as it may be unrealistic to check every item as they are produced in the interest of saving time and money. By integrating the light field imaging system into 3D printing systems, quality check can be performed on each individual product produced by the 3D printing systems through the reconstruction of images of products as they are being printed. In many embodiments, the light field imaging quality control system applied to mass production systems are less demanding on surrounding environment, as the light field imaging system is capable of image generation even in low-light environments.

In some embodiments, the light field imaging system may be incorporated as a quality control apparatus that checks the fabrication of electronic devices at every stage of the fabrication process. In several embodiments, the light field imaging system can be used to capture information of scenes that have only been illuminated for limited amounts of time.

In situations such as the imaging of cold atom clouds seen in atom interferometers, the environment around the nominal atom cloud position may often be populated with various laser beams for magneto-optical traps and other purposes. The total light collected by the light field imaging device may be dictated by the array of mirrors and the lens used to image the plane of virtual objects. For a set up using very small mirrors, the total light collected by the systems tends to be 50%. In this set up, each view may have a severely reduced field of view and collects a small fraction of the total light. In some embodiments, the maximum of light collected is 50% since the mirrors are arranged to cover one hemisphere around the object.

In the limit of large mirrors, each view can collect as much light as the lens' aperture maximally allows. The light field imager can collect approximately m times the light that the conventional imager collects, where m is the number of views folded with the mirrors. This can offer a potential order of magnitude gains in the light collected depending on the size and number of mirrors used. In several embodiments, the camera and the lens are positioned outside of the vacuum chamber where the atom clouds are located in.

Although specific methods of light field imaging with mirror arrays are discussed above, many different imaging methods can be implemented in accordance with many different embodiments of the invention. It is therefore to be understood that the present invention may be practiced in ways other than specifically described, without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A light field imaging system comprising:
a mirror array comprising a plurality of mirrors, where each mirror in the plurality of mirrors is positioned to reflect light from a target object towards a lens such that a different view of the target object is visible in each mirror in the plurality of mirrors from the viewpoint of the lens;
a fixing device configured to position the target object at a fixed distance between the mirror array and the lens;
the lens configured to focus the reflected light;
a sensor configured to capture an image depicting a plurality of reflections of the target object from the mirror array, where the sensor and the mirror array are on opposite sides of the lens;
a processor; and
a memory containing a light field imaging application that directs the processor to:
obtain the captured image;
extract a light field of the target object based on the plurality of reflections of the target object; and construct a three-dimensional model of the target object based on the light field.

2. The system of claim 1, wherein to extract the light field of the target object, the light field imaging application further directs the processor to:
map each of the plurality of reflected lights to its corresponding predetermined angle; and
measure an intensity and a direction of each of the plurality of reflected lights.

3. The system of claim 1, where each view in the plurality of views of the target object is a folded view comprising reflected light rays off of the target object off a corresponding mirror, and light rays directly off of the target object.

4. The system of claim 1, where the processor constructs the image of the target object by representing the target object as densities dependent on 3D spatial coordinates.

5. The system of claim 1, where the processor uses a fully differentiable reconstruction model to construct the image of the target object.

6. The system of claim 1, where constructing the image of the target object is gradient-based.

7. The system of claim 1, where the mirror array further comprises an alignment grid capable of putting the mirror array in focus of the lens.

8. The system of claim 1, where the plurality of mirrors comprises a plurality of 5 mm diameter smooth mirrors.

9. The system of claim 1, where the target object is suspended in front of the center of the mirror array.

10. The system of claim 5, where the reconstruction model is trained by:
extract a set of views from the plurality of views where each view is a set of pixels and an intensity for each pixel from the set of pixels; and
train the reconstruction model with the extracted set of views.

11. A method for light field imaging, the method comprising:
projecting light at a target object;
reflecting light from the target object towards a lens using mirror array comprising a plurality of mirrors such that a different view of the target object is visible in each mirror in the plurality of mirrors from the viewpoint of the lens;
a fixing device configured to position the target object at a fixed distance between the mirror array and the lens;
focusing the reflected light at the lens;
capturing, using a sensor, an image depicting a plurality of reflections of the target object from the mirror array, where the sensor and the mirror array are on opposite sides of the lens;
obtaining the captured image;
extracting a light field of the target object based on the plurality of reflections of the target object; and
constructing a three-dimensional model of the target object based on the light field.

12. The method of claim 11, where the extracting of the light field comprises:
mapping each of the plurality of reflected lights to its corresponding predetermined angle; and
measuring an intensity and a direction of each of the plurality of reflected lights.

13. The method of claim 11, where each view in the plurality of views of the target object is a folded view comprising reflected light rays off of the target object off a corresponding mirror, and light rays directly off of the target object.

14. The method of claim 11, further comprising constructing the image of the target object by representing the target object as densities dependent on 3D spatial coordinates.

15. The method of claim 11, where a fully differentiable reconstruction model is used to construct the image of the target object.

16. The method of claim 11, where the constructing of the image of the target object is gradient-based.

17. The method of claim 11, where the mirror array is put in focus of the lens by an alignment grid.

18. The method of claim 11, where the plurality of mirrors comprises a plurality of 5 mm diameter smooth mirrors.

19. The method of claim 11, where the target object is suspended in front of the center of the mirror array.

20. The method of claim 15, where the reconstruction model is trained by:

extracting a set of views from the plurality of views where each view is a set of pixels and an intensity for each pixel from the set of pixels; and training the reconstruction model with the extracted set of views.

* * * * *